United States Patent
Lee et al.

(10) Patent No.: US 12,109,806 B2
(45) Date of Patent: Oct. 8, 2024

(54) INKJET PRINTING APPARATUS AND METHOD FOR INSPECTING INKJET HEAD USING SAME

(71) Applicant: Samsung Display Co., LTD., Yongin-si (KR)

(72) Inventors: Byung Chul Lee, Yongin-si (KR); Heung Cheol Jeong, Yongin-si (KR); Myung Soo Huh, Yongin-si (KR); Cheol Lae Roh, Yongin-si (KR); Do Hun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 219 days.

(21) Appl. No.: 17/904,370

(22) PCT Filed: Jun. 2, 2020

(86) PCT No.: PCT/KR2020/007171
§ 371 (c)(1),
(2) Date: Aug. 16, 2022

(87) PCT Pub. No.: WO2021/167172
PCT Pub. Date: Aug. 26, 2021

(65) Prior Publication Data
US 2023/0055700 A1    Feb. 23, 2023

(30) Foreign Application Priority Data

Feb. 17, 2020 (KR) .................. 10-2020-0019050

(51) Int. Cl.
*B41J 2/045* (2006.01)
*G01N 15/1434* (2024.01)
*G01N 15/14* (2006.01)

(52) U.S. Cl.
CPC ......... *B41J 2/0451* (2013.01); *B41J 2/04586* (2013.01); *G01N 15/1434* (2013.01); *G01N 2015/1486* (2013.01)

(58) Field of Classification Search
None
See application file for complete search history.

(56) References Cited

U.S. PATENT DOCUMENTS 6,422,687 B1    7/2002  Jacobson
7,410,905 B2    8/2008  Ushiyama et al.
(Continued)

FOREIGN PATENT DOCUMENTS

CN    1573449 A    2/2005
JP    2004-356128 A    12/2004
(Continued)

OTHER PUBLICATIONS

Ryu, Machine Translation of WO-2021015385-A1, 2021 (Year: 2021).*
(Continued)

*Primary Examiner* — Scott A Richmond
(74) *Attorney, Agent, or Firm* — Lewis Roca Rothgerber Christie LLP

(57) ABSTRACT

Provided are an inkjet printing apparatus and a method for inspecting an inkjet head using same. The inkjet printing apparatus comprises: an inspection stage unit on which an inspection substrate is seated; an inkjet head unit including at least one inkjet head that ejects ink containing dipoles and a solvent in which the dipoles disperse, on the inspection stage unit; and a particle count inspection unit that is located so as to be spaced apart from the inkjet head unit in one direction. The particle count inspection unit comprises: a first heat treatment unit that is located on the top portion of the inspection stage unit; and a first sensing unit that is located on the bottom portion of the inspection stage unit (Continued)

and measures the number of dipoles sprayed onto the inspection substrate.

20 Claims, 33 Drawing Sheets

(56) References Cited

U.S. PATENT DOCUMENTS

| | | |
|---|---|---|
| 8,529,013 B2 | 9/2013 | Watt et al. |
| 2003/0037702 A1 | 2/2003 | Jacobson |
| 2005/0003640 A1 | 1/2005 | Ushiyama et al. |
| 2007/0052757 A1 | 3/2007 | Jacobson |
| 2009/0251504 A1 | 10/2009 | White |
| 2009/0262155 A1 | 10/2009 | Kim |

FOREIGN PATENT DOCUMENTS

| | | | |
|---|---|---|---|
| JP | 2005-153454 A | 6/2005 | |
| JP | 2005-236040 A | 9/2005 | |
| JP | 2007-136450 A | 6/2007 | |
| JP | 4344270 B2 | 10/2009 | |
| JP | 2010-036548 A | 2/2010 | |
| JP | 2018-001098 A | 1/2018 | |
| KR | 2006-0034870 A | 4/2006 | |
| KR | 10-0781997 B1 | 12/2007 | |
| KR | 2009-0110176 A | 10/2009 | |
| WO | WO 99/10767 | 3/1999 | |
| WO | WO 2017/130707 A1 | 8/2017 | |
| WO | WO-2020059994 A1 * | 3/2020 | .......... B41J 2/04501 |
| WO | WO-2020141652 A1 * | 7/2020 | ............ B41J 11/002 |
| WO | WO-2021015385 A1 * | 1/2021 | ................ B41J 2/06 |

OTHER PUBLICATIONS

Lee, MachineTranslationofWO-2020141652-A1, 2020 (Year: 2020).*
Jeong, MachineTranslationofWO-2020059994-A1, 2020 (Year: 2020).*
International Search Report of PCT/KR2020/007171, Nov. 16, 2020, 4 pp.

* cited by examiner

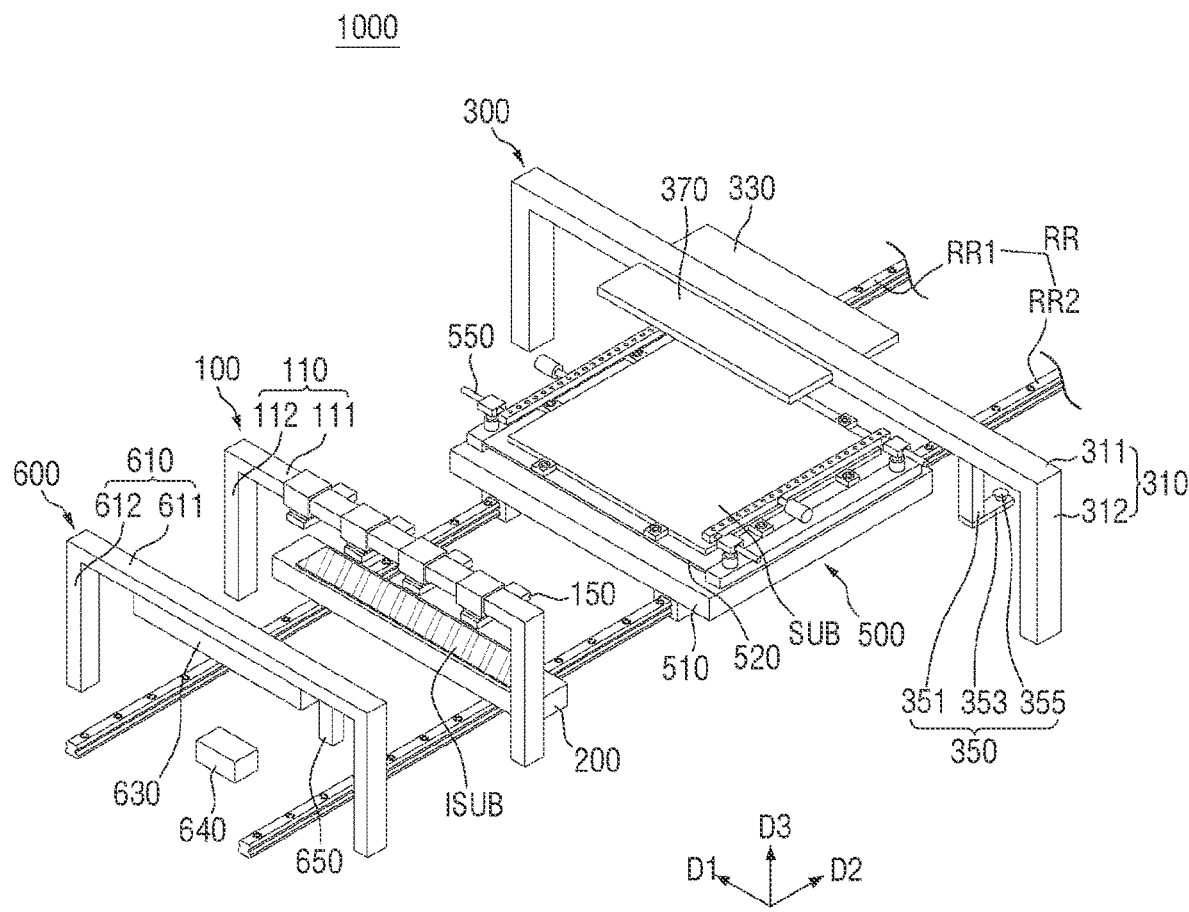
[Fig. 1]

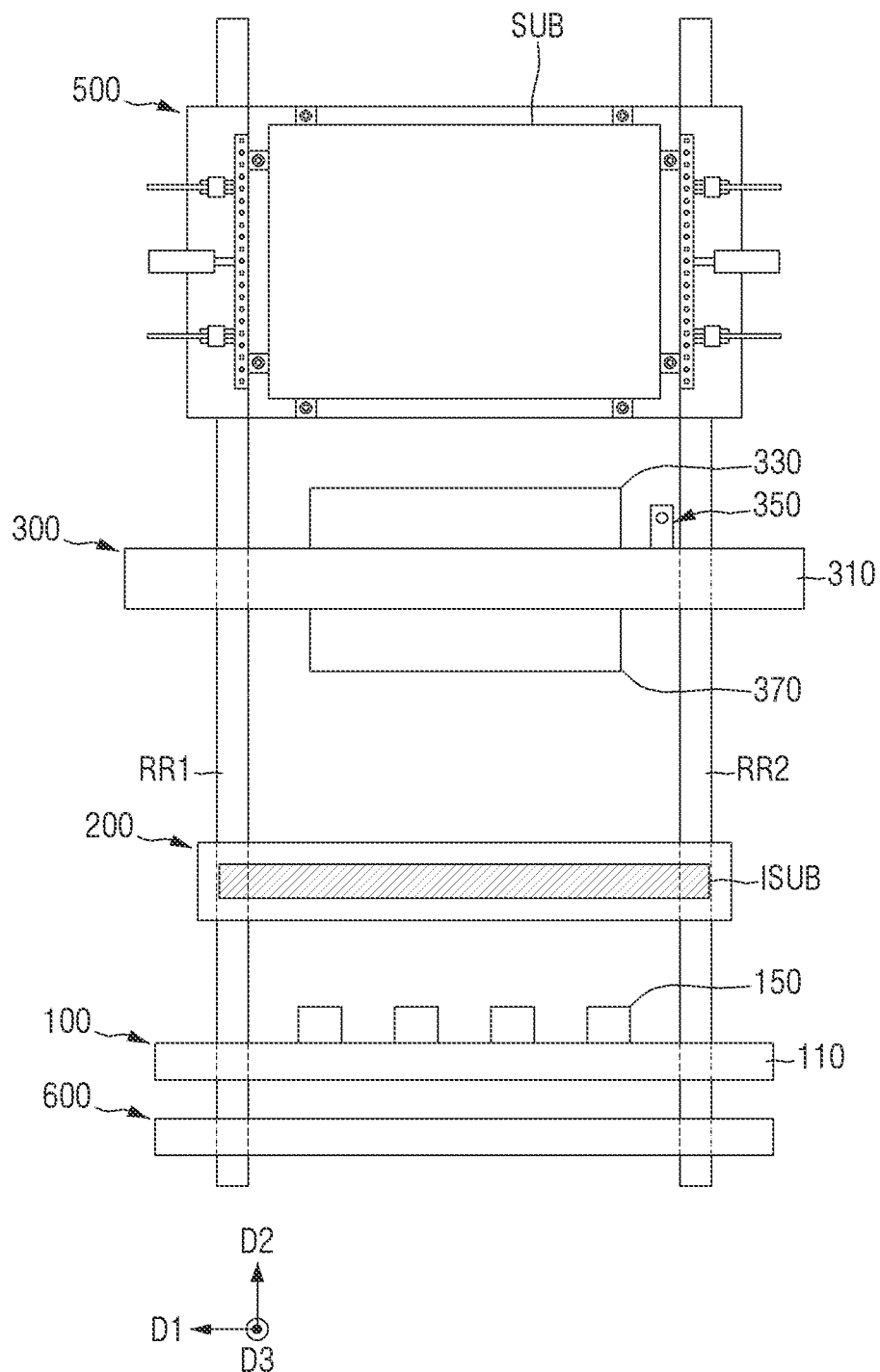
[Fig. 2]

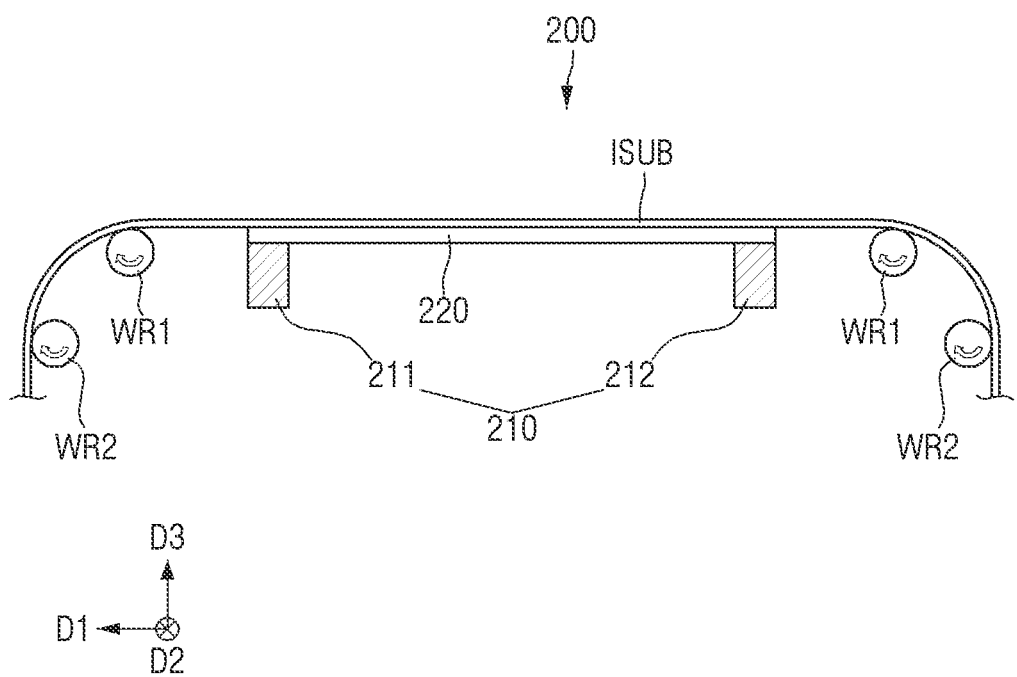
[Fig. 3]

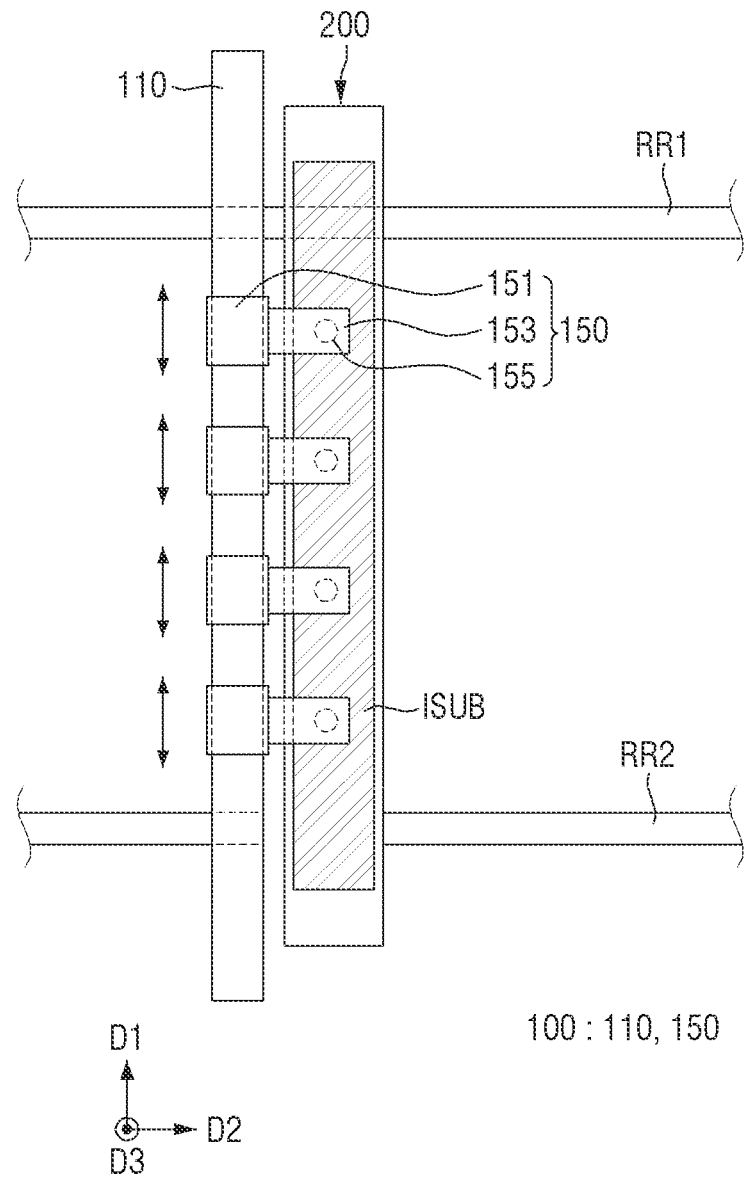
[Fig. 4]

[Fig. 5]
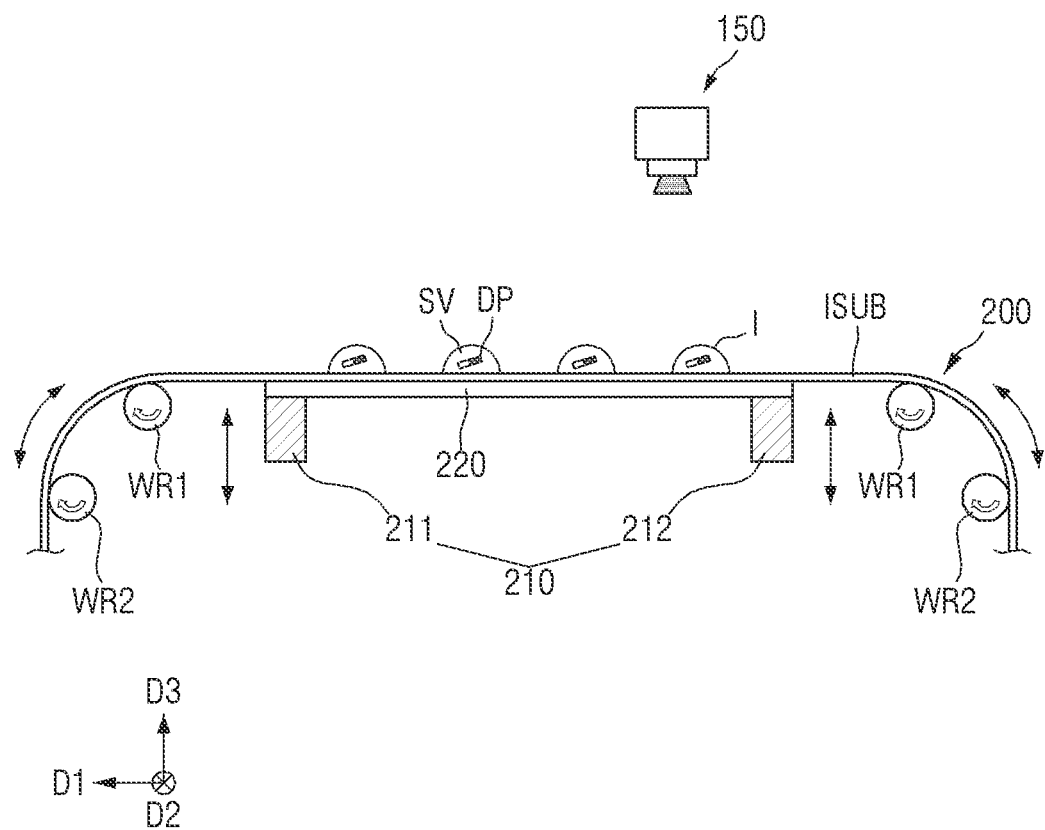

[Fig. 6]
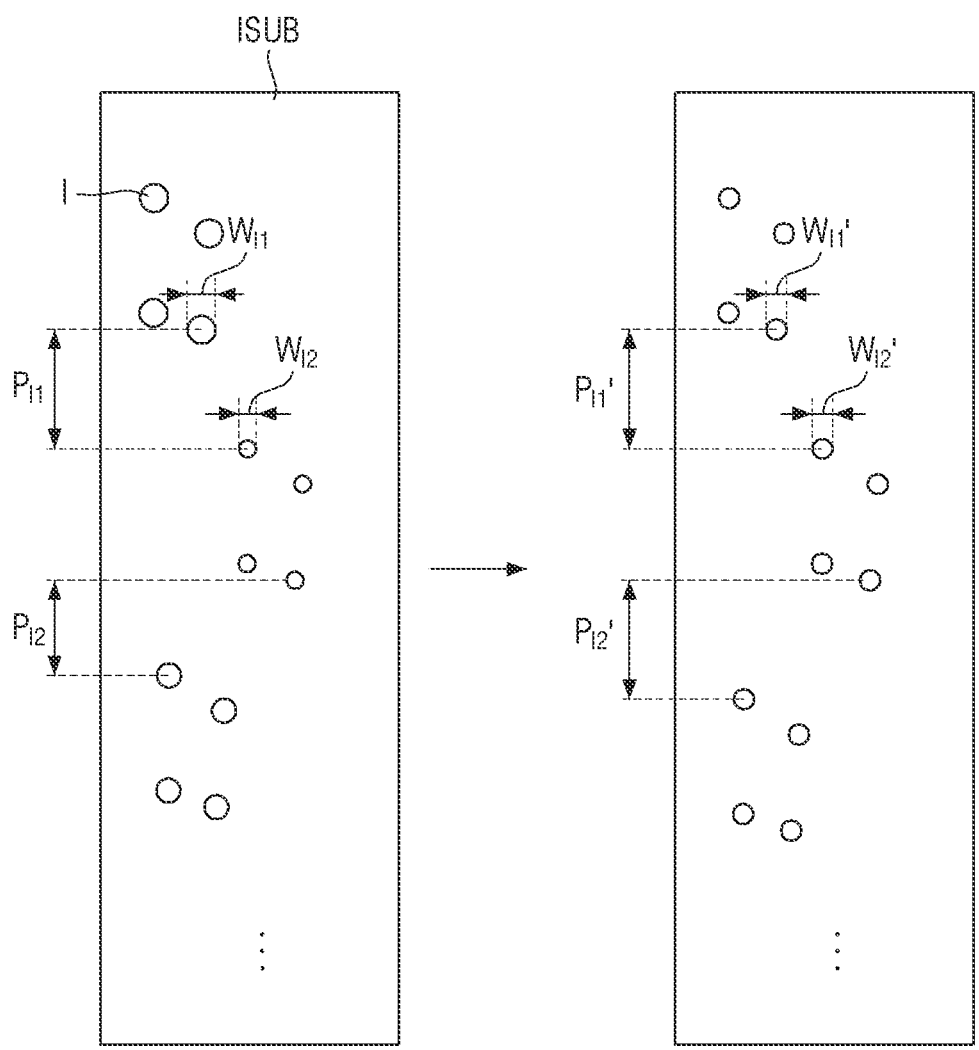

[Fig. 7]
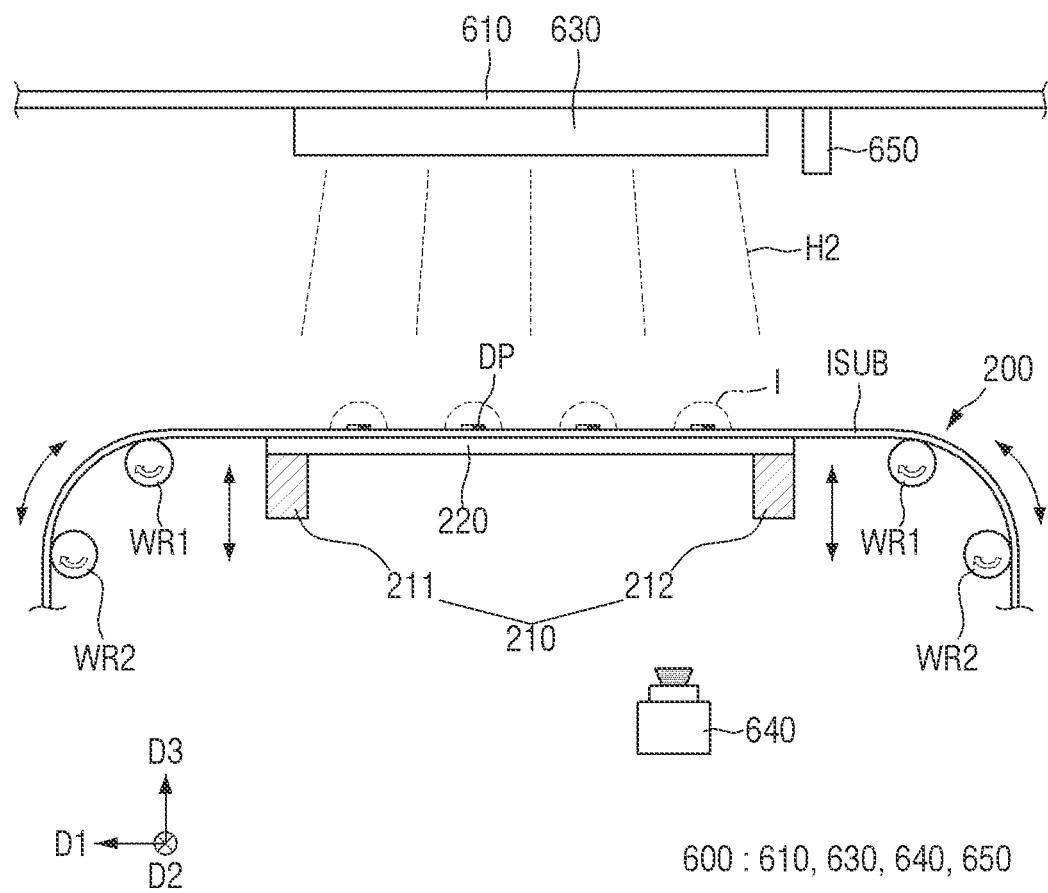

[Fig. 8]
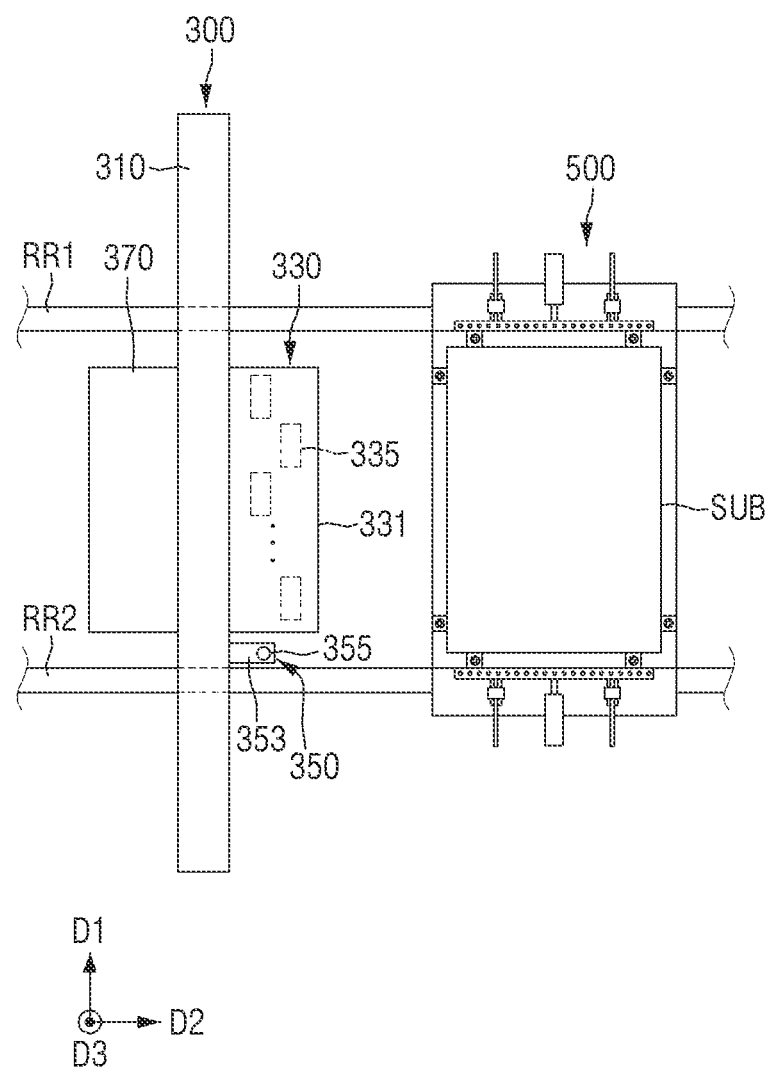

[Fig. 9]
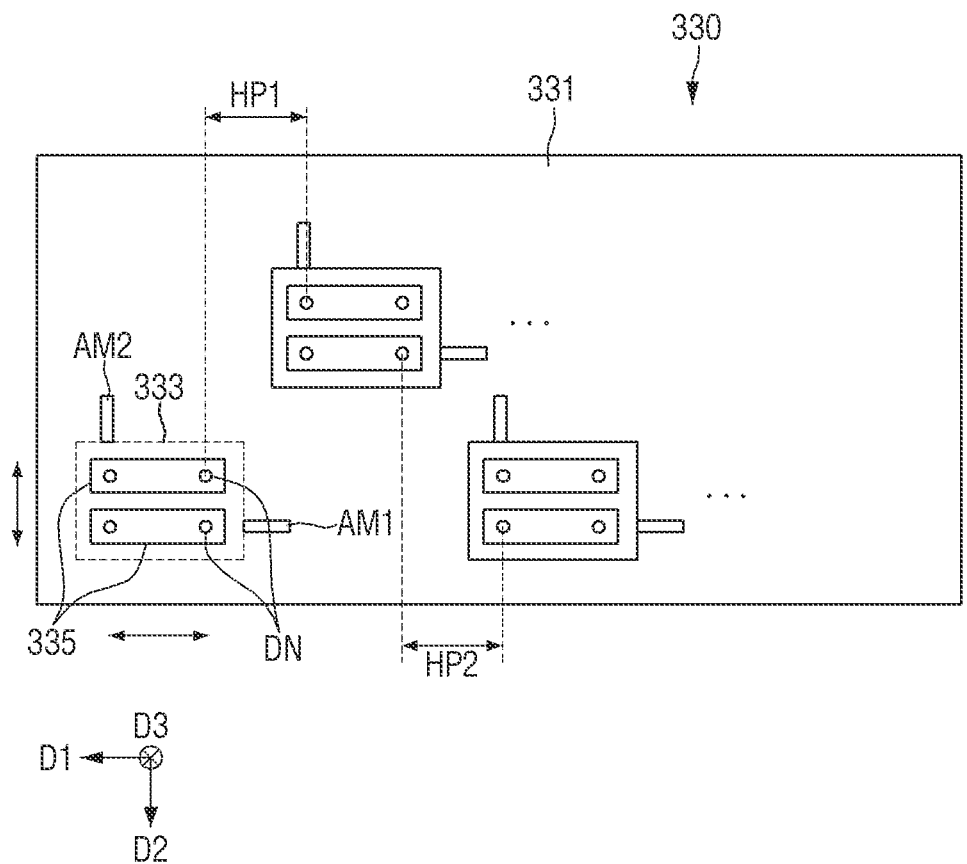
[Fig. 10]
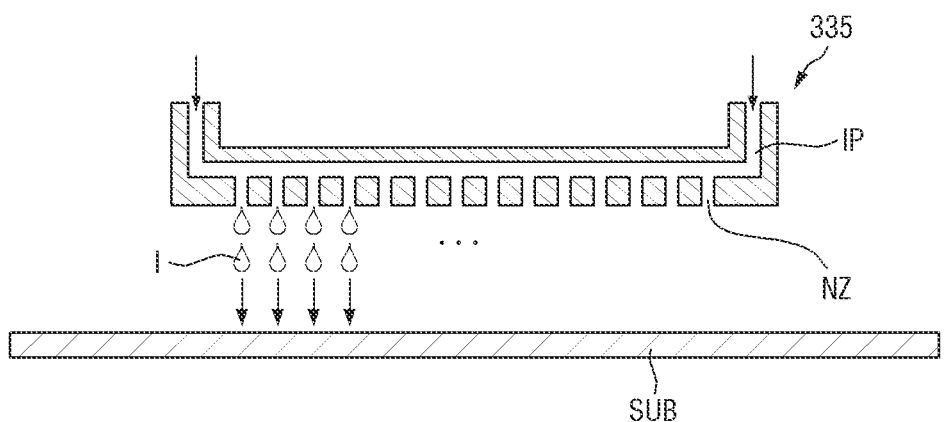

[Fig. 11]
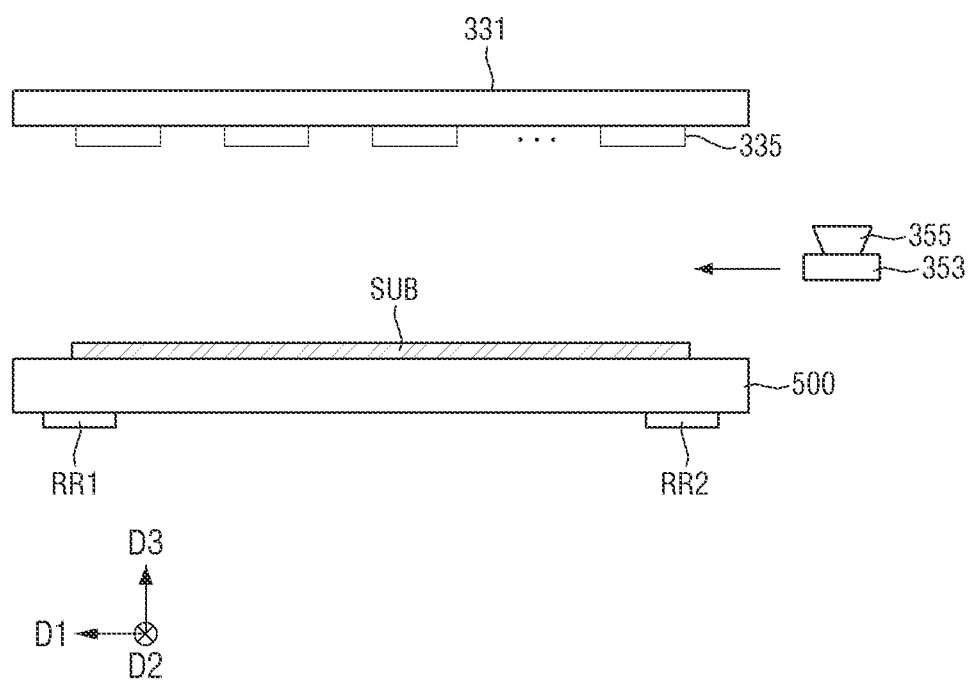

[Fig. 12]
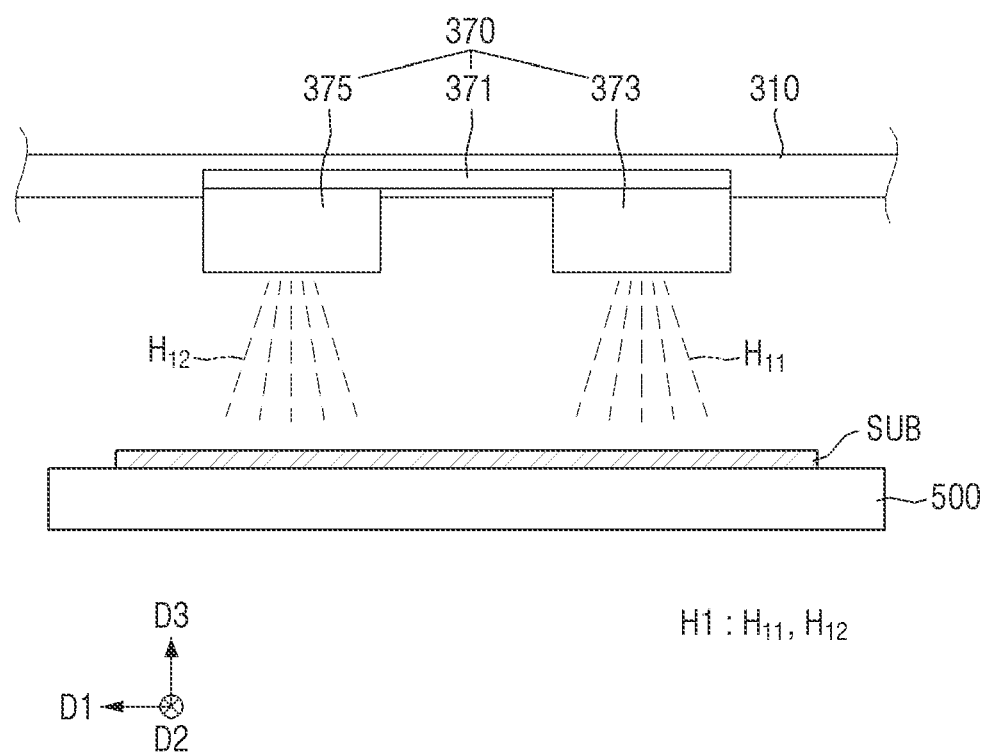

[Fig. 13]
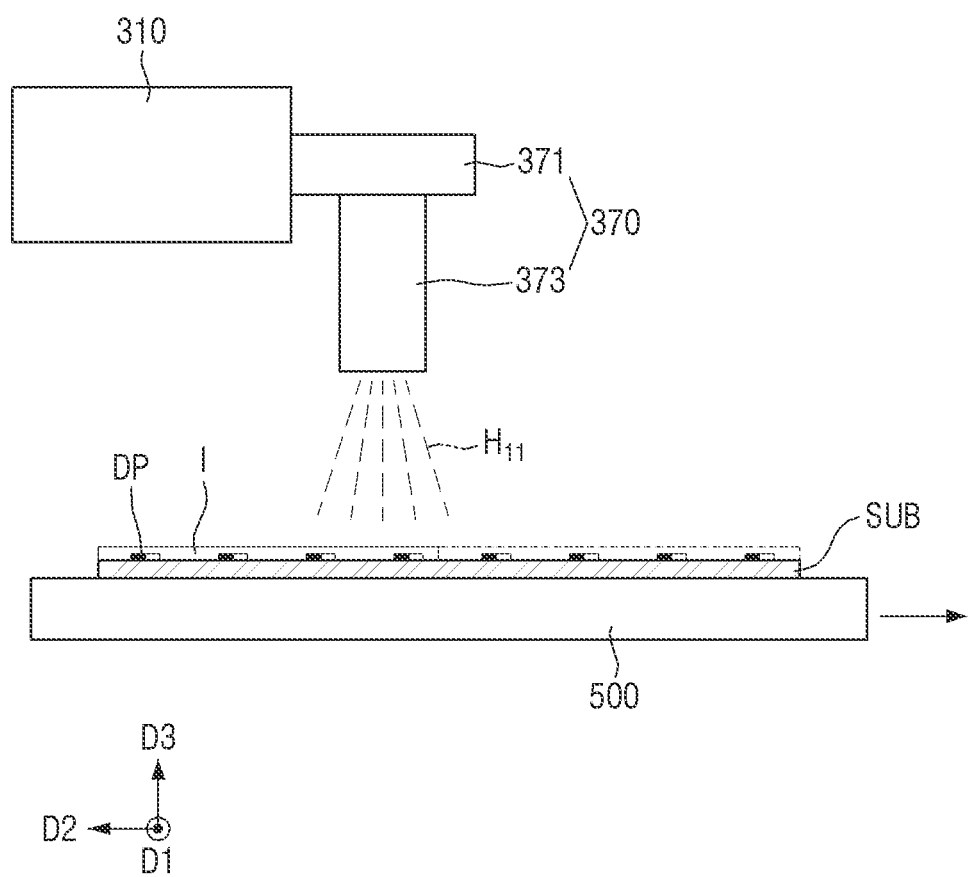

[Fig. 14]
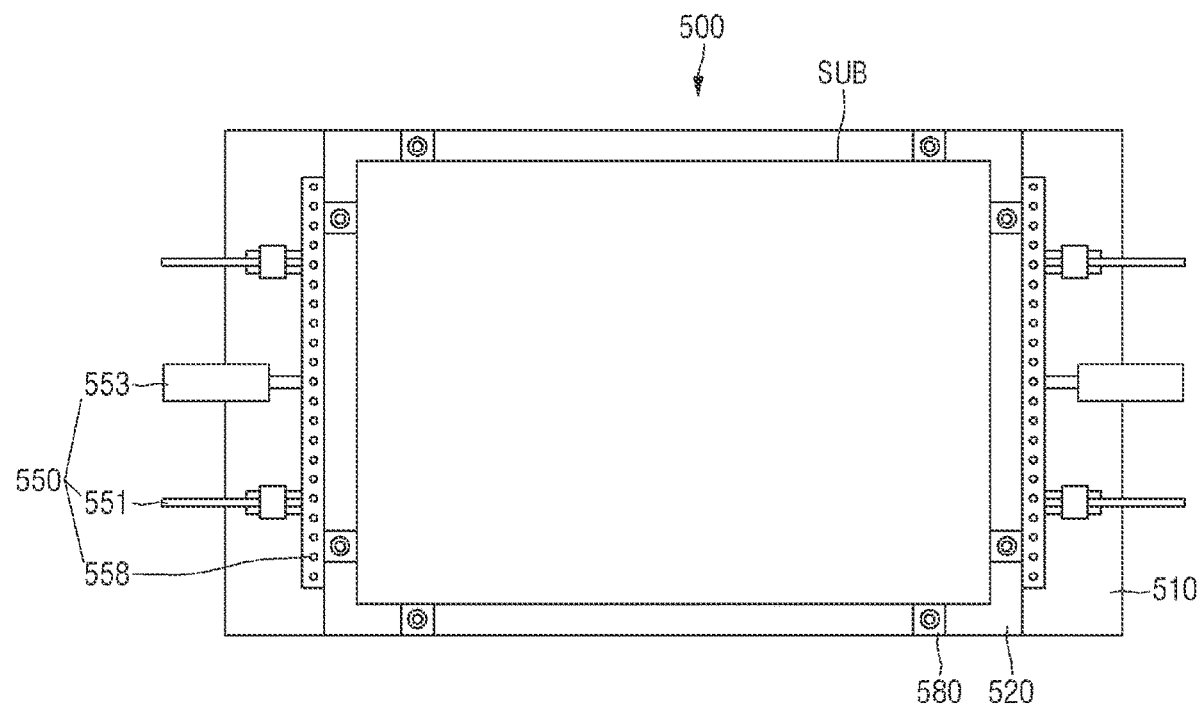

[Fig. 15]
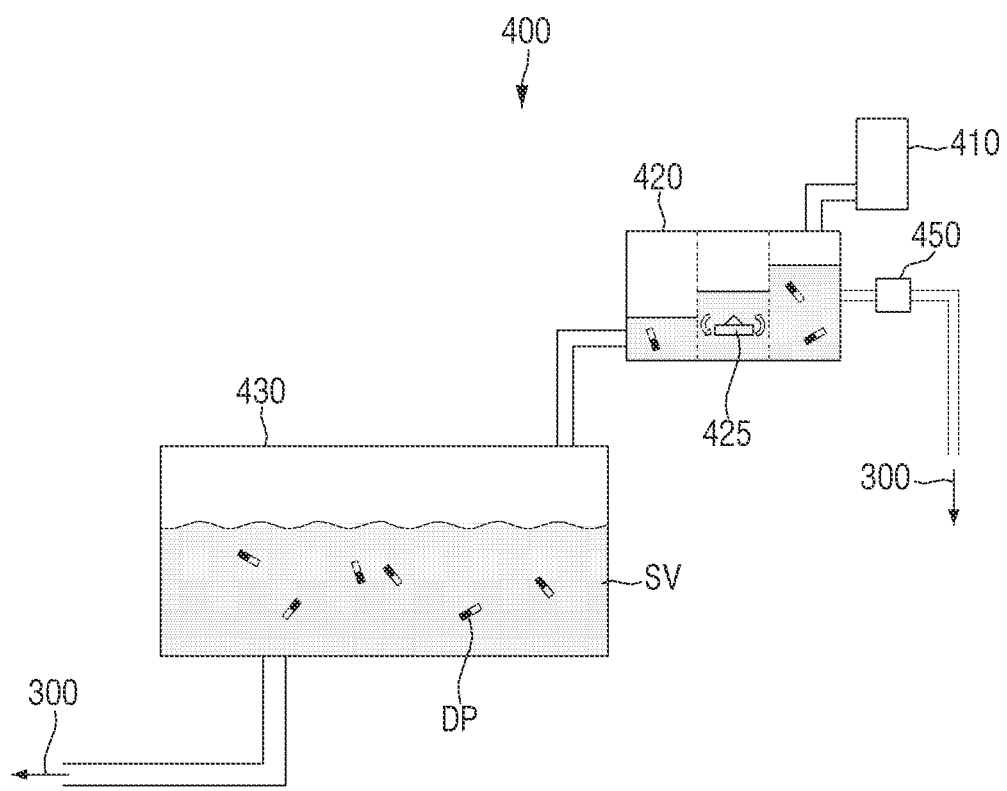

[Fig. 16]
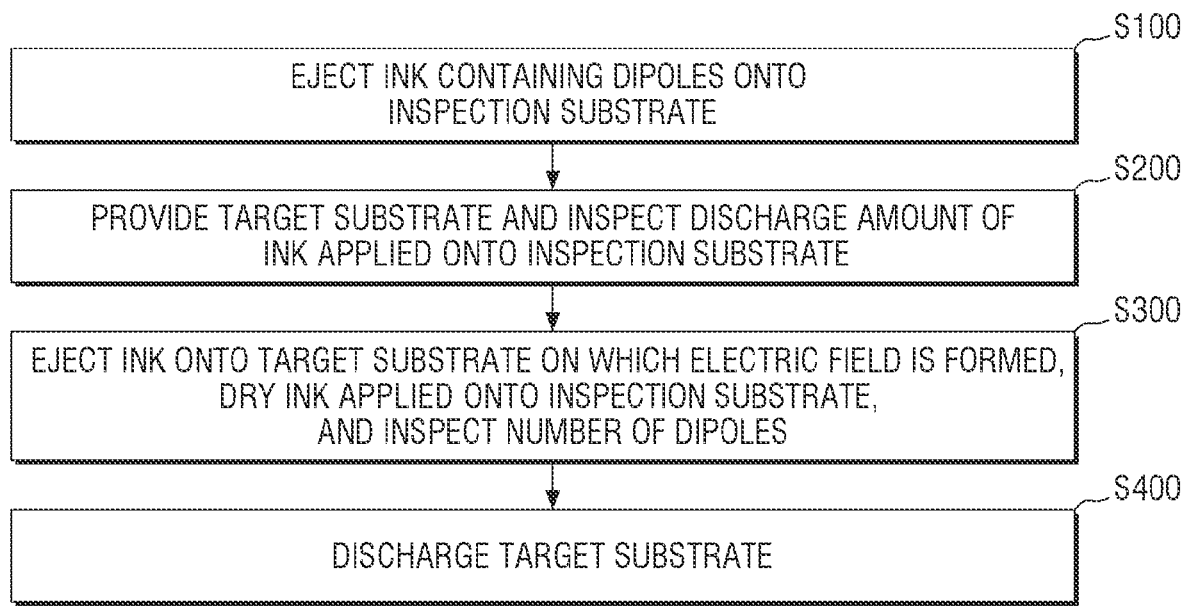

[Fig. 17]
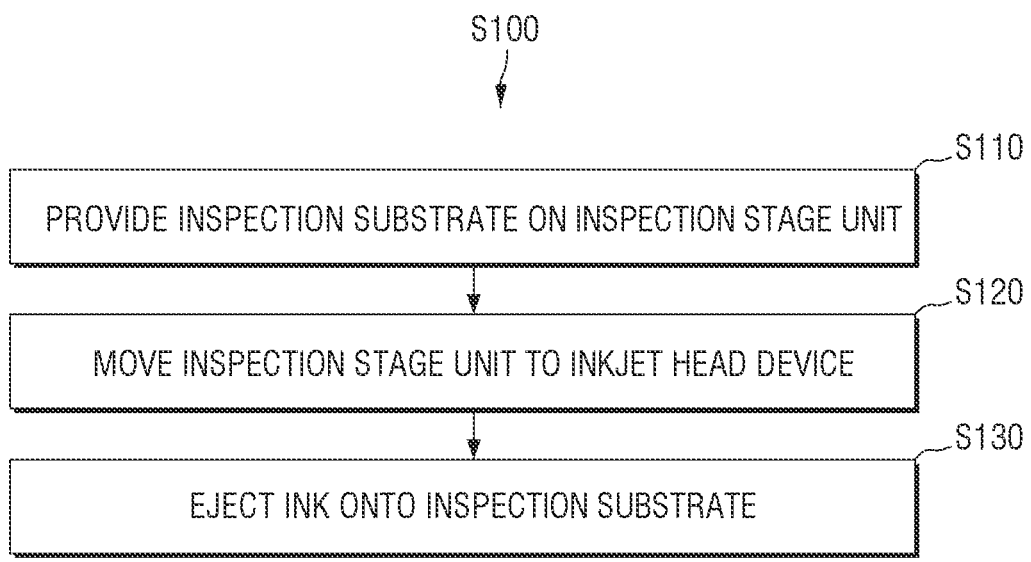

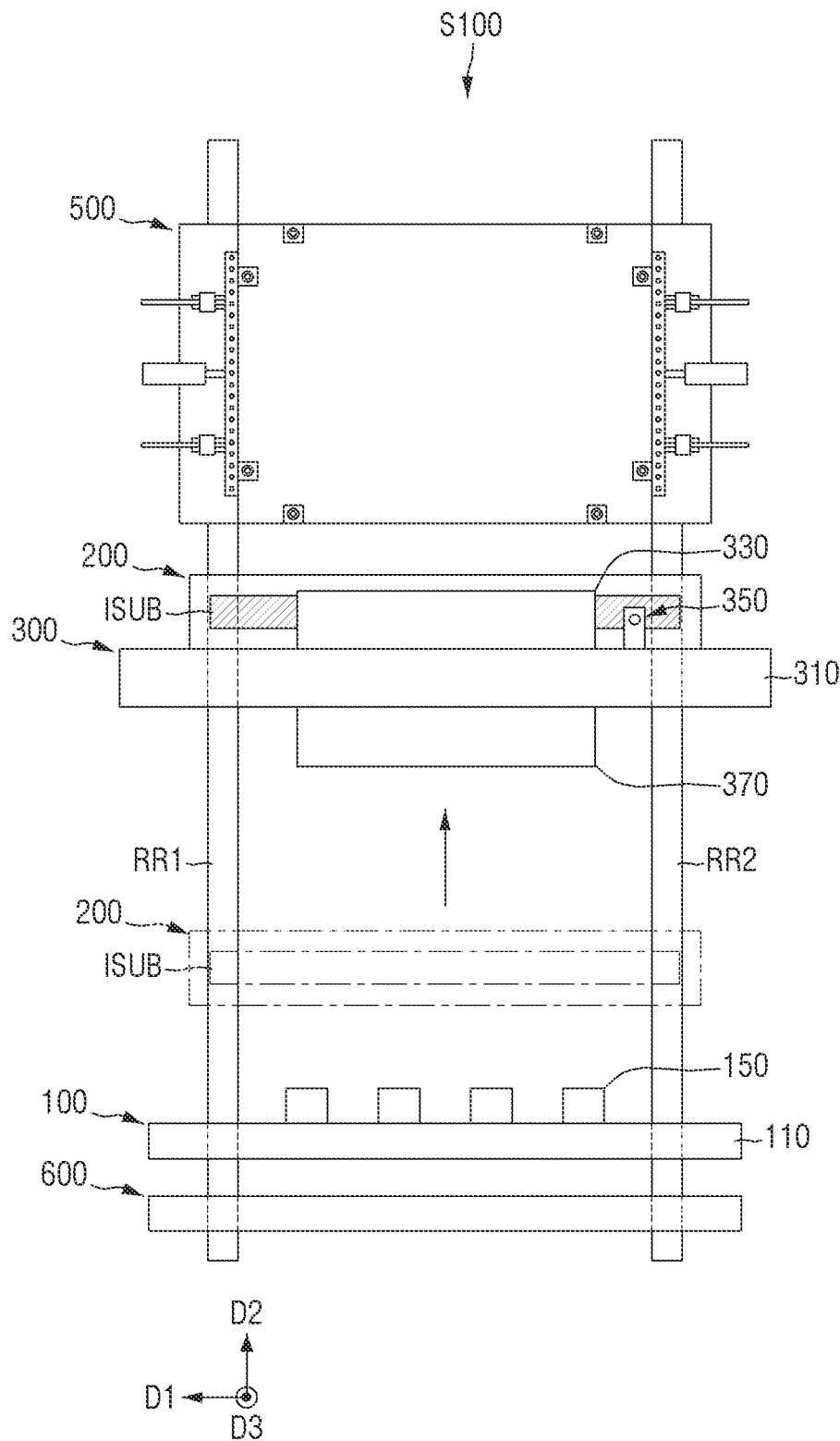
[Fig. 18]

[Fig. 19]
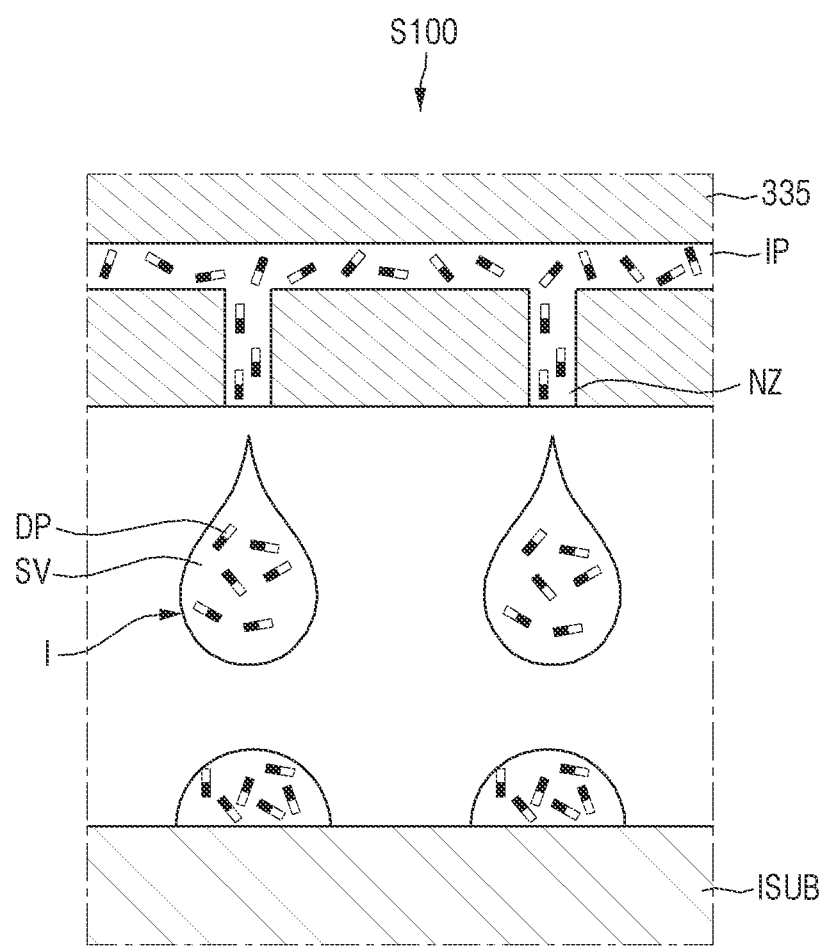

[Fig. 20]
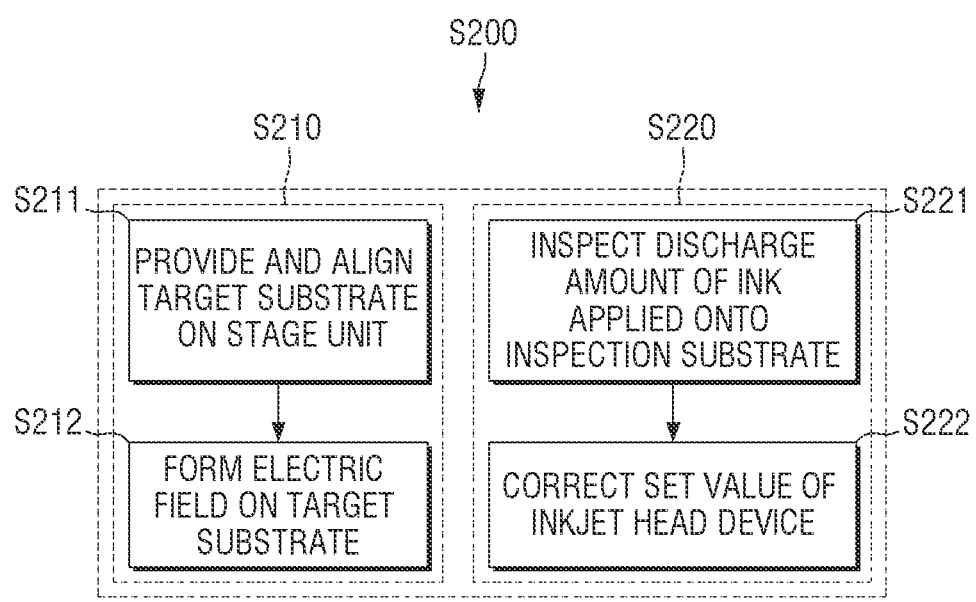

[Fig. 21]
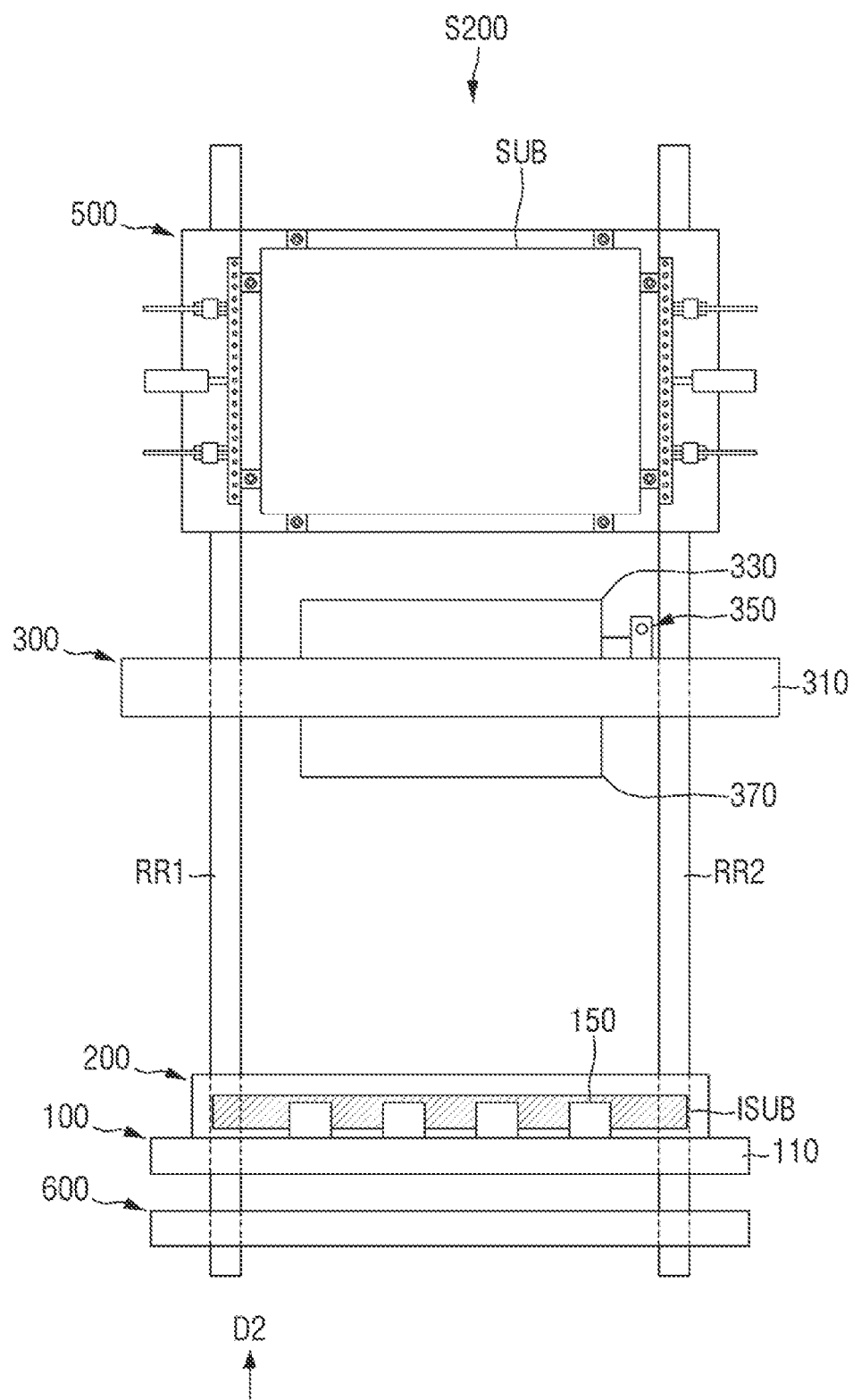

[Fig. 22]
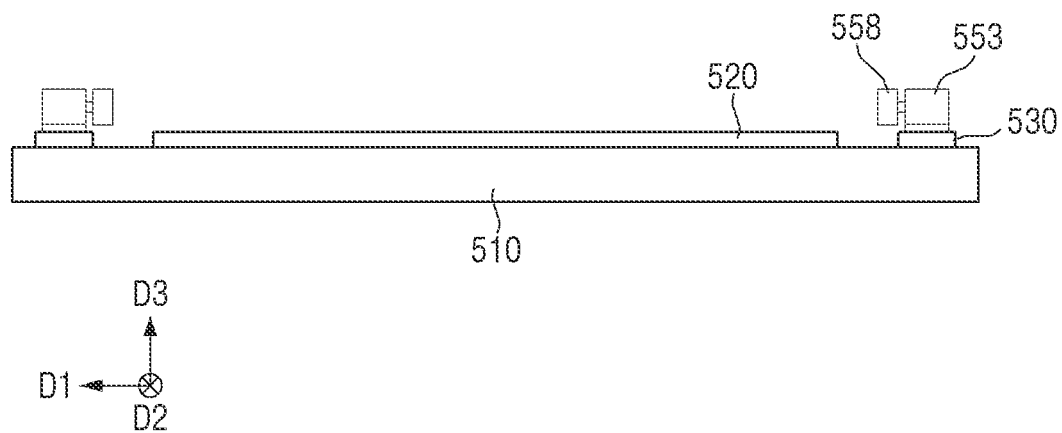
[Fig. 23]
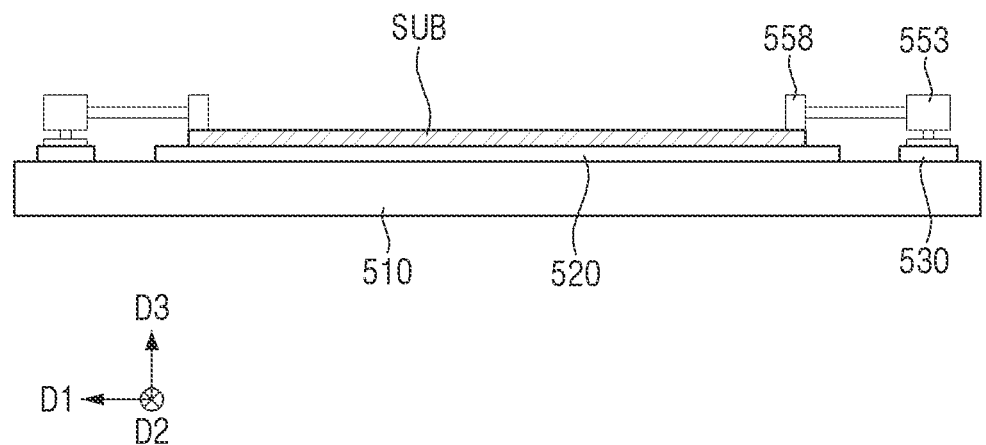

[Fig. 24]
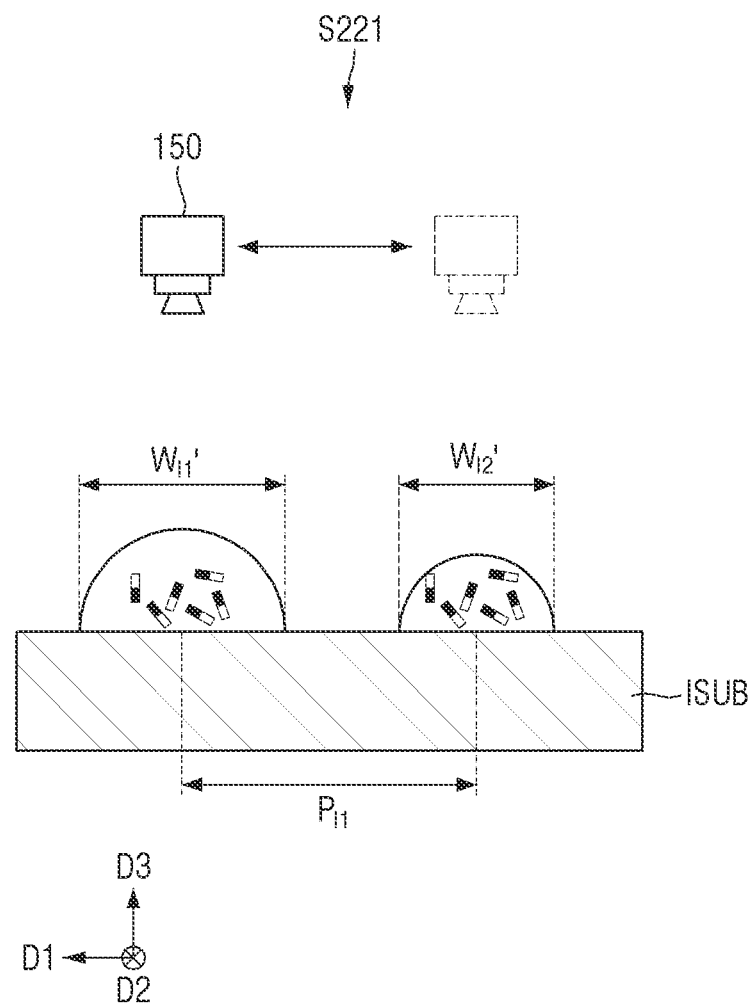

[Fig. 25]
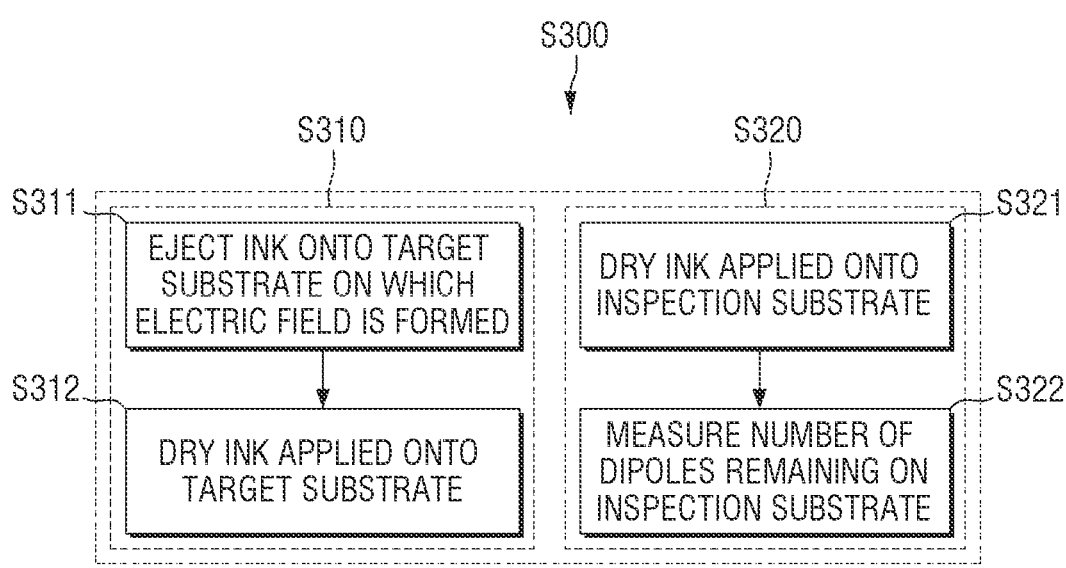

[Fig. 26]
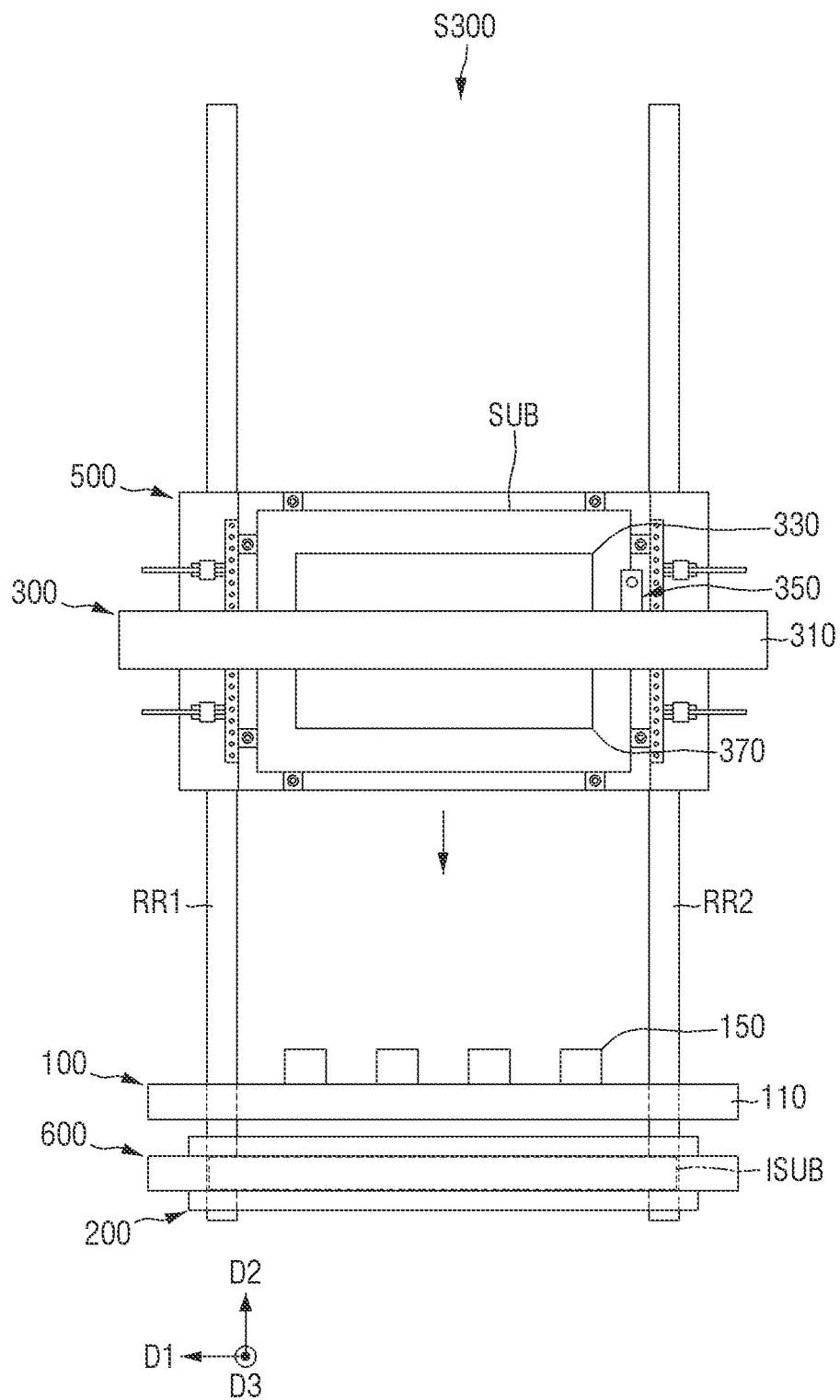

[Fig. 27]
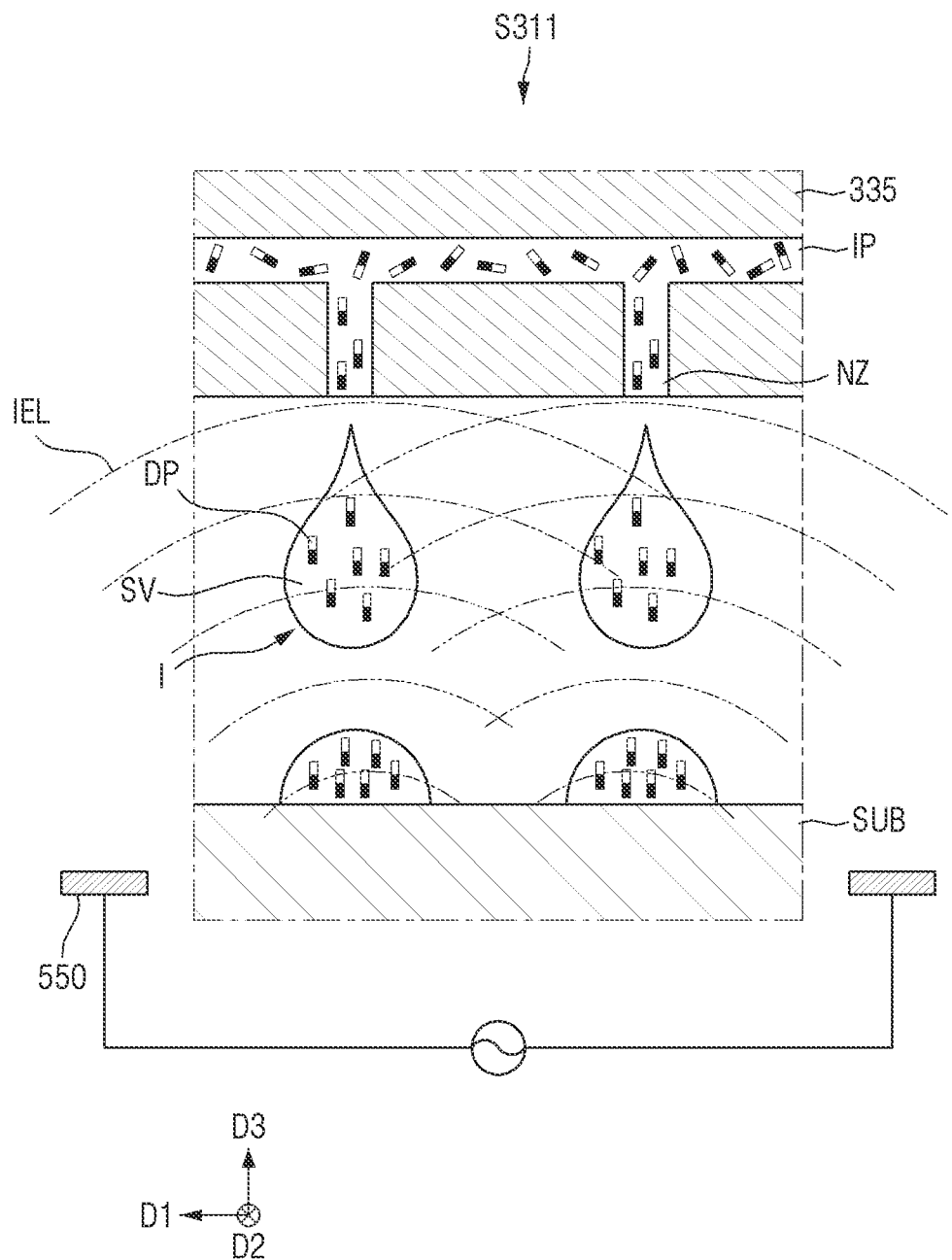

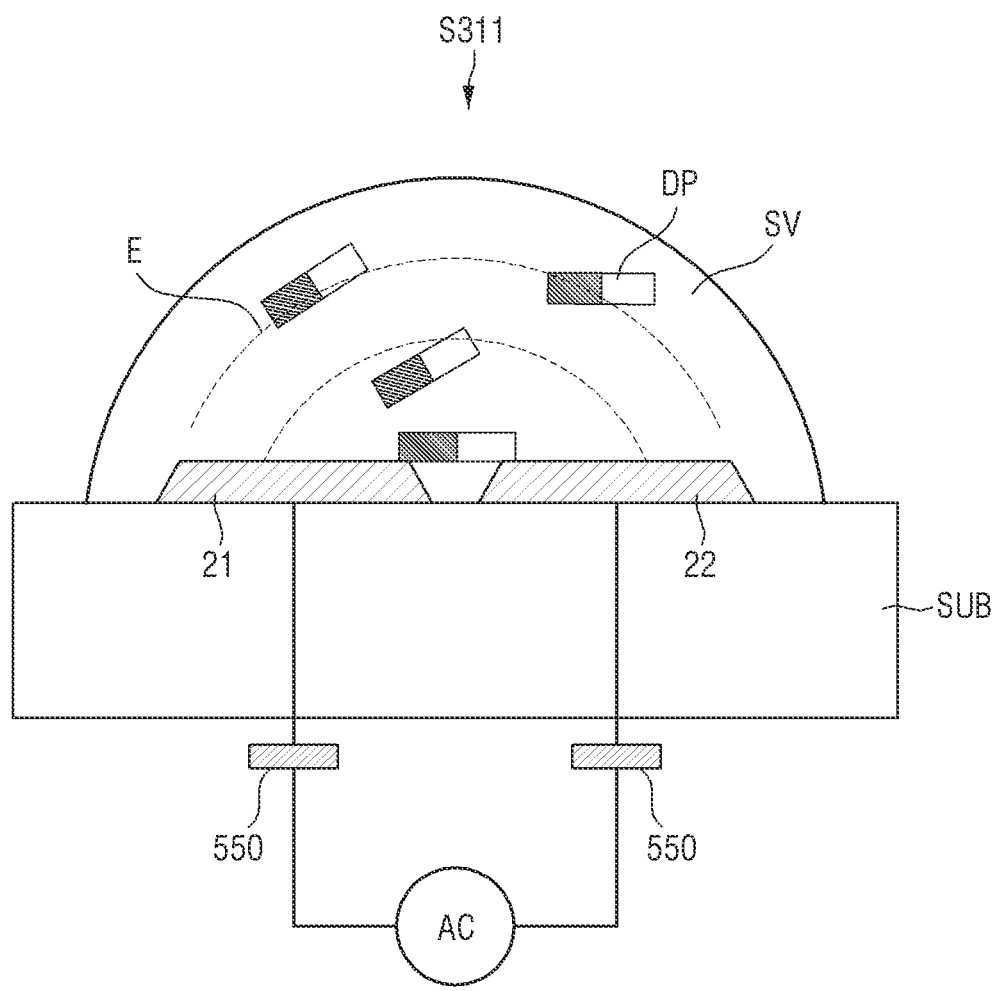
[Fig. 28]

[Fig. 29]
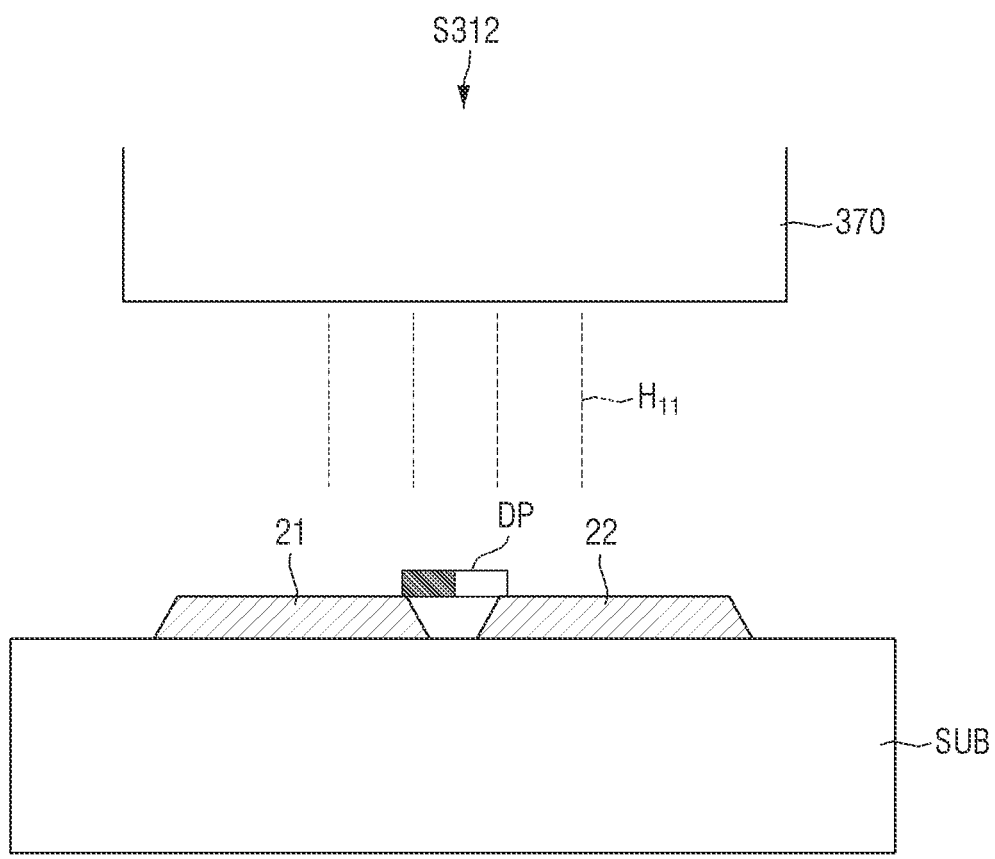

[Fig. 30]
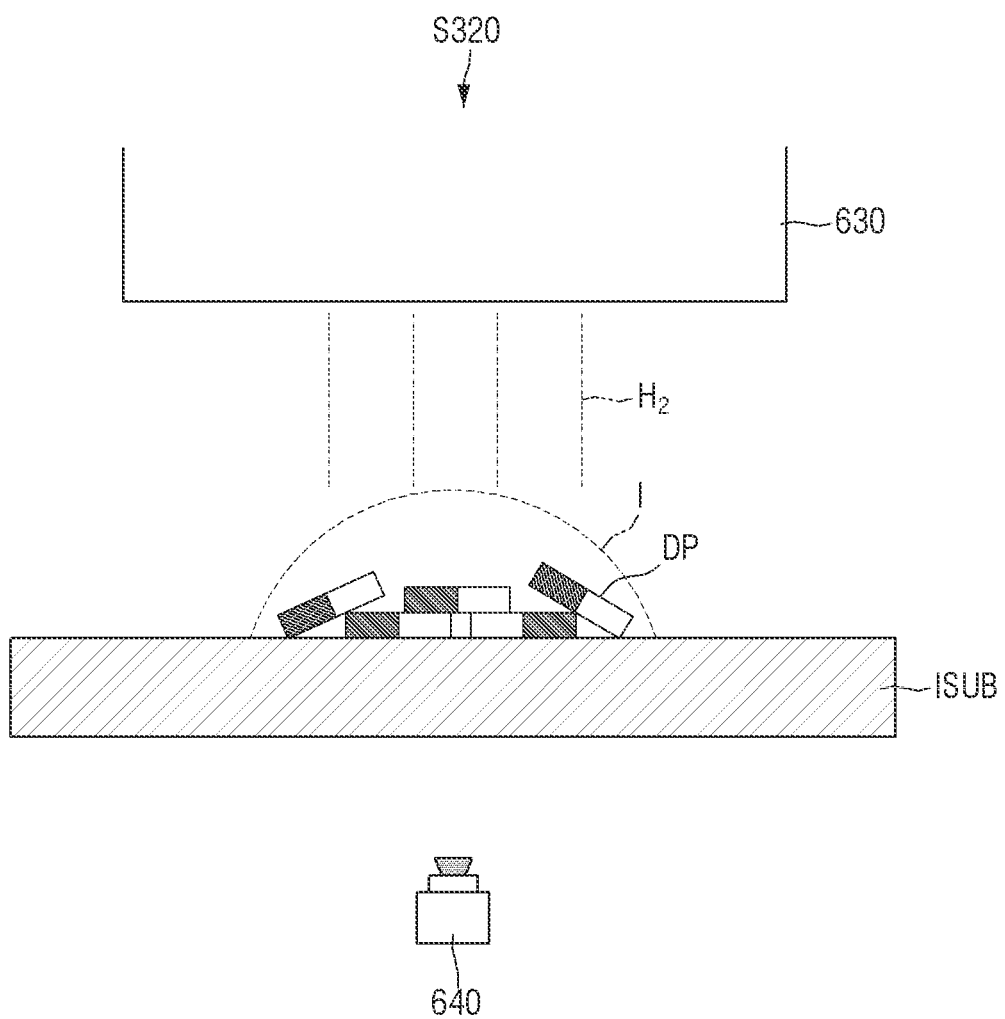

[Fig. 31]
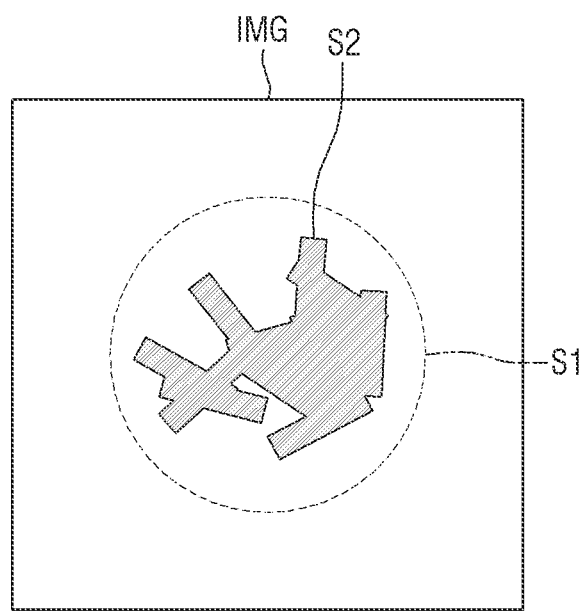

[Fig. 32]
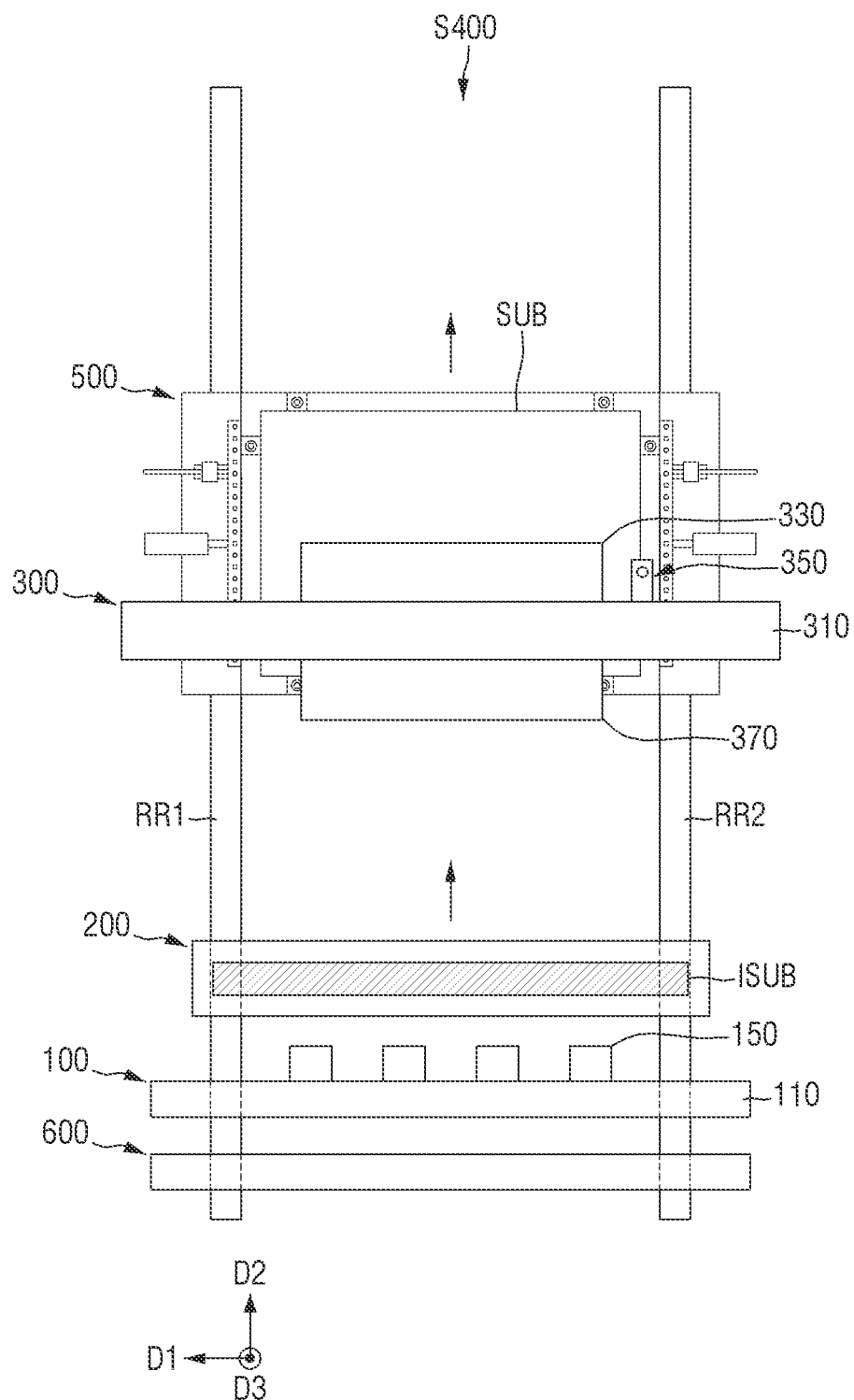

[Fig. 33]
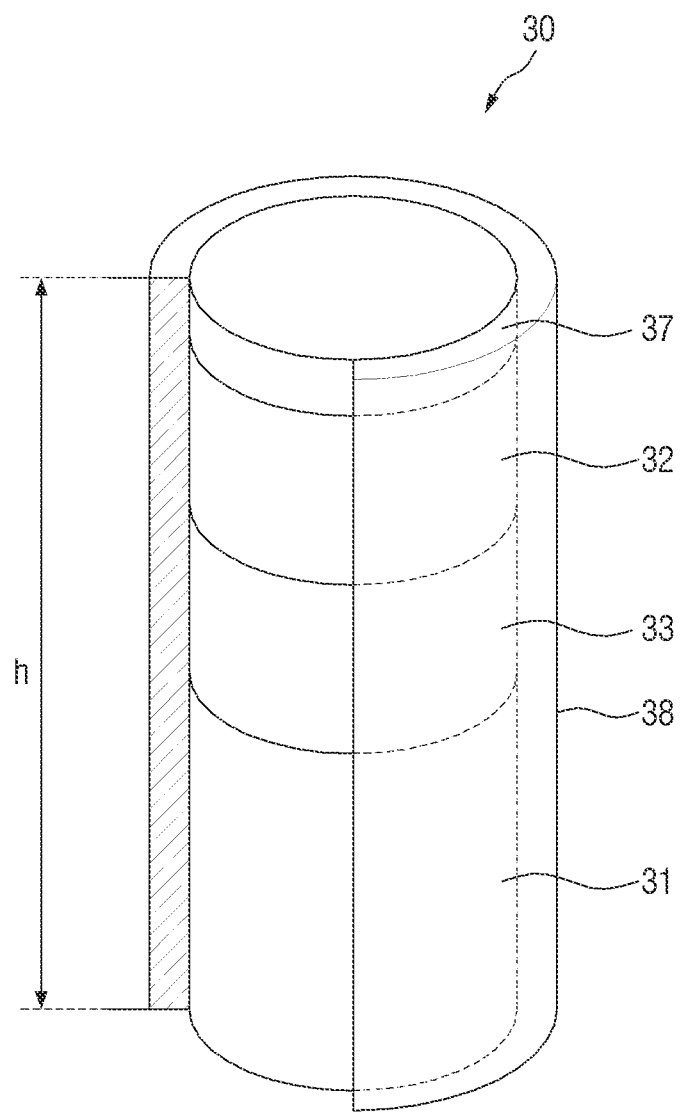

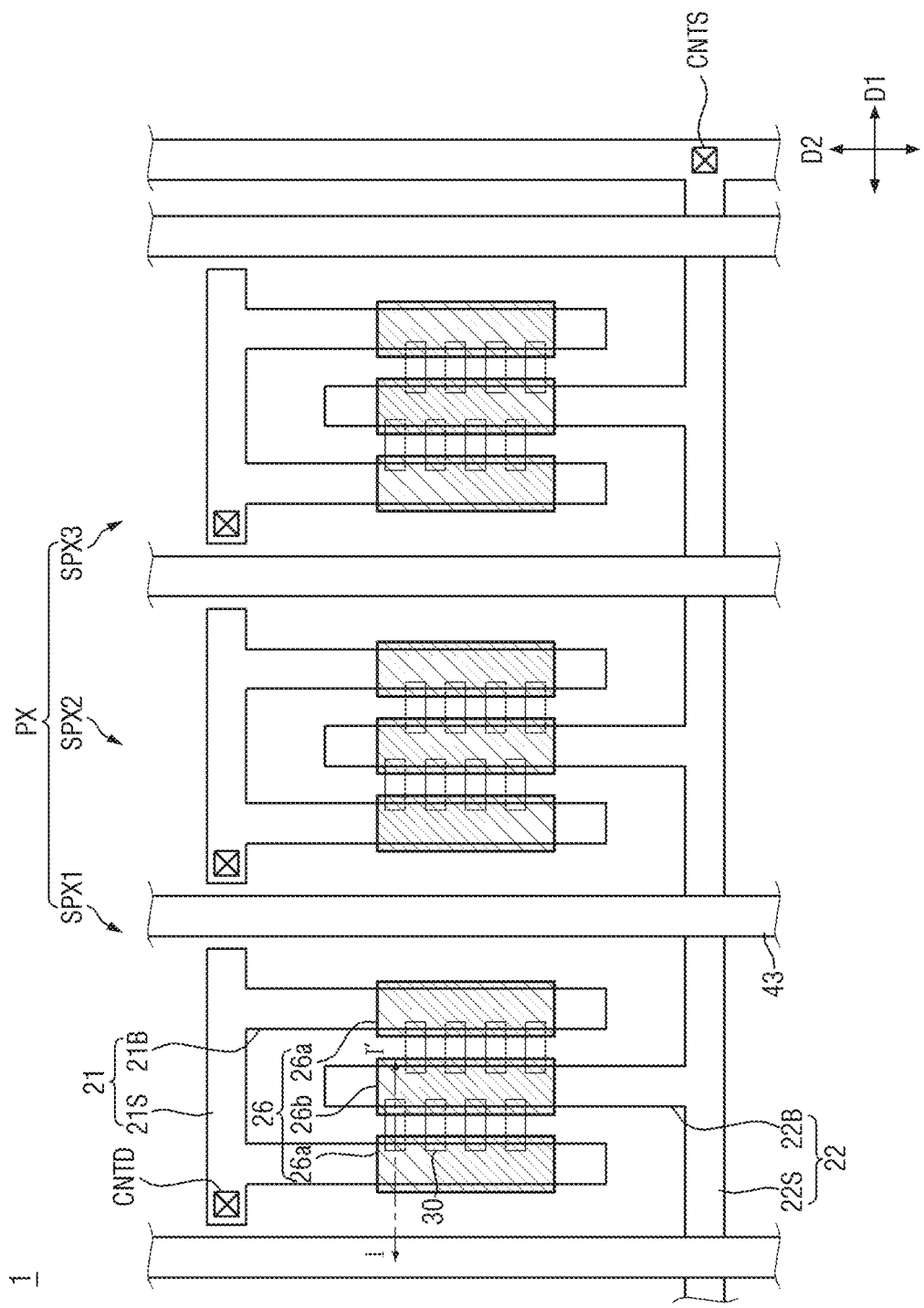
[Fig. 34]

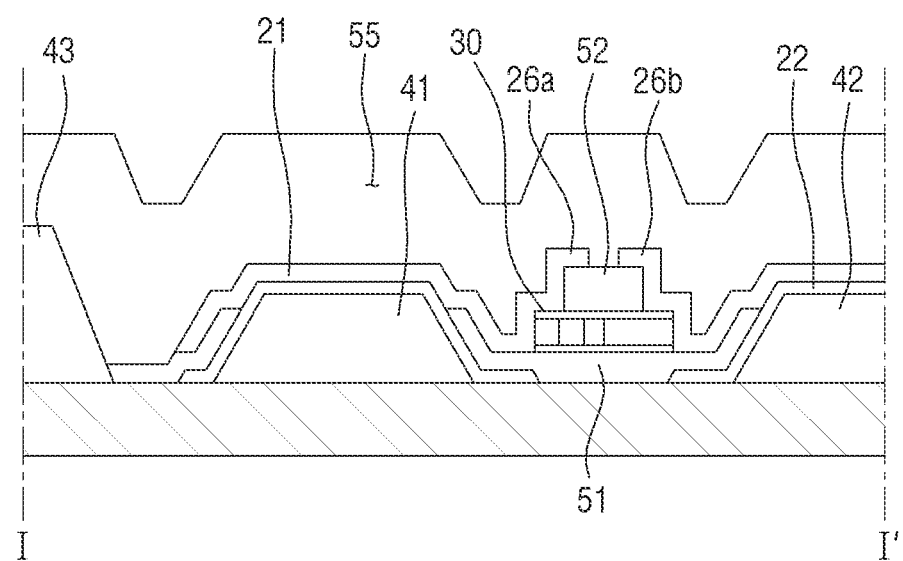
[Fig. 35]

INKJET PRINTING APPARATUS AND METHOD FOR INSPECTING INKJET HEAD USING SAME

CROSS-REFERENCE TO RELATED APPLICATIONS

This application is a U.S. National Phase Patent Application of International Patent Application Number PCT/KR2020/007171, filed on Jun. 2, 2020, which claims priority to Korean Patent Application Number 10-2020-0019050, filed on Feb. 17, 2020, the entire content of all of which is incorporated herein by reference.

TECHNICAL FIELD

The present disclosure relates to an inkjet printing apparatus and a method of inspecting an inkjet head using the same.

BACKGROUND ART

Display devices are becoming increasingly important with the development of multimedia. In response to this, various types of display devices such as organic light-emitting diode (OLED) displays, liquid crystal displays (LCDs), and the like are being used.

Devices for displaying an image of a display device include display panels such as OLED display panels and LCD panels. Among them, light-emitting diode (LED) display panels may include light-emitting elements. For example, LEDs include OLEDs using an organic material as a fluorescent material, inorganic LEDs using an inorganic material as a fluorescent material, and the like.

DISCLOSURE

Technical Problem

The present disclosure is directed to providing an inkjet printing apparatus capable of performing a printing process of printing with ink using an inkjet head device and an inspection process of the inkjet head device as connected processes.

The present disclosure is also directed to providing an inkjet printing apparatus capable of adjusting errors, such as the number of dipoles, an amount of ink, and the like that occur during a printing process, while the process is performed.

The scope of the present disclosure is not limited to the above-described objects and other objects that are not described may be clearly understood by those skilled in the art from the following descriptions.

Technical Solution

One aspect of the present disclosure provides an inkjet printing apparatus including an inspection stage unit on which an inspection substrate is placed, an inkjet head unit including at least one inkjet head configured to eject ink, which contains dipoles and a solvent in which the dipoles are dispersed, on the inspection stage unit, and a particle count inspection unit which is located apart from the inkjet head unit in one direction, wherein the particle count inspection unit includes a first heat treatment unit located above the inspection stage unit, and a first sensing unit located below the inspection stage unit and configured to measure the number of dipoles ejected onto the inspection substrate.

The inkjet printing apparatus may further include a second sensing unit configured to measure a position of first ink which is ejected from the inkjet head and applied onto the inspection substrate.

The first sensing unit may measure the number of dipoles located in a region corresponding to the position of the first ink.

The first sensing unit may measure the number of dipoles that remain on the inspection substrate after the solvent is removed by the first heat treatment unit.

The particle count inspection unit may further include a light irradiation unit which is located above the inspection stage unit and emits light toward the inspection stage unit, and the first sensing unit may include a camera unit for photographing a lower surface of the inspection substrate.

The camera unit may generate image data by photographing a region corresponding to the position of the first ink.

The second sensing unit may measure an area of the first ink, and the first sensing unit may calculate a dipole pattern using the image data and measure an area of the dipole pattern.

The particle count inspection unit may measure the number of dipoles by comparing the area of the first ink with the area of the dipole pattern.

The particle count inspection unit may compare the measured number of dipoles with a reference set value.

The inkjet printing apparatus may further include an ink supply device for supplying the ink to the inkjet head unit, wherein the particle count inspection unit may control the ink supply device according to a result of the comparison of the measured number of dipoles and the reference set value.

The inkjet printing apparatus may further include a stage moving unit configured to move the inspection stage unit in one direction.

The first heat treatment unit may radiate light in the infrared wavelength band.

Another aspect of the present disclosure provides an inkjet printing apparatus including an inspection stage unit on which an inspection substrate is placed, a stage unit which is located apart from the inspection stage unit and on which a target substrate is placed, an inkjet head unit which is located above the inspection stage unit and the stage unit and includes a plurality of inkjet heads configured to eject ink, which contains dipoles and a solvent in which the dipoles are dispersed, a first heat treatment unit located above the stage unit and configured to radiate first light, a first sensing unit configured to measure a position of the ink applied onto the inspection substrate, and a particle count inspection unit configured to inspect the number of dipoles contained in the ink applied onto the inspection substrate, wherein the particle count inspection unit includes a second heat treatment unit located above the inspection stage unit and configured to radiate second light, and a second sensing unit located above the inspection stage unit and configured to measure the number of dipoles contained in the ink applied onto the inspection substrate.

The second sensing unit may measure the number of dipoles that remain on the inspection substrate after the solvent is removed by the second heat treatment unit.

The inkjet printing apparatus may further include an ink supply device configured to supply the ink to the inkjet head unit, wherein the particle count inspection unit may control the ink supply device according to a result of comparing the measured number of dipoles with a reference set value.

Still another aspect of the present disclosure provides a method of inspecting an inkjet head, including ejecting ink, which contains a plurality of dipoles and a solvent in which the plurality of dipoles are dispersed, onto an inspection substrate, inspecting a discharge amount of the ink applied onto the inspection substrate, removing the solvent contained in the ink applied onto the inspection substrate, and measuring the number of dipoles remaining on the inspection substrate.

The inspecting of the discharge amount of the ink may include measuring a diameter and area of the ink applied onto the inspection substrate.

The measuring of the number of dipoles may include calculating a dipole pattern by photographing the inspection substrate from under the inspection substrate and measuring an area of the dipole pattern.

The measuring of the number of dipoles may include measuring the number of dipoles by comparing the measured area of the ink with the measured area of the dipole pattern.

The dipoles remaining on the inspection substrate may be arranged regardless of orientation.

Other specific details of other embodiments of the present disclosure are included in the detailed description and the accompanying drawings.

Advantageous Effects

An inkjet printing apparatus according to one or more embodiments can include an inkjet head device, a discharge amount inspection unit, and a particle count inspection unit to perform an inspection process on an inspection substrate while a printing process is performed on a target substrate. Accordingly, a time that is suitable for the inspection process can be shortened, and errors can be detected in real time and compensated at the same time at which the printing process is performed. Therefore, a state of the inkjet head device can be inspected at a high speed, and the quality of the target substrate can be improved.

Further, the inkjet printing apparatus can include a particle count inspection unit to measure the number of dipoles remaining after a solvent contained in ink is dried using a second heat treatment unit. Therefore, the number of dipoles can be measured without being affected by the characteristics of the solvent, and thus a measurement error rate can be reduced, and test reliability can be improved.

Effects according to the embodiments of the present disclosure are not limited by the content exemplified above and more various effects are included in the specification.

DESCRIPTION OF DRAWINGS

FIG. 1 is a schematic perspective view of an inkjet printing apparatus according to one or more embodiments.

FIG. 2 is a schematic plan view of an inkjet printing apparatus according to one or more embodiments.

FIG. 3 is a schematic cross-sectional view of an inspection stage unit according to one or more embodiments.

FIG. 4 is a schematic plan layout of a discharge amount inspection unit and an inspection stage unit according to one or more embodiments.

FIG. 5 is a schematic cross-sectional layout of a discharge amount inspection unit and an inspection stage unit according to one or more embodiments.

FIG. 6 is a schematic view illustrating ink applied onto an inspection substrate according to one or more embodiments.

FIG. 7 is a schematic cross-sectional layout of a particle count inspection unit and an inspection stage unit according to one or more embodiments.

FIG. 8 is a schematic plan layout of an inkjet head unit and an inspection stage unit according to one or more embodiments.

FIG. 9 is a bottom view of an inkjet head unit according to one or more embodiments.

FIG. 10 is a schematic view illustrating ink being ejected from an inkjet head according to one or more embodiments.

FIG. 11 is a schematic cross-sectional view illustrating an inkjet head unit being inspected by a third sensing unit of an inkjet head device according to one or more embodiments.

FIG. 12 is a cross-sectional view of a first heat treatment unit according to one or more embodiments.

FIG. 13 is a schematic view illustrating driving of a heat treatment unit according to one or more embodiments.

FIG. 14 is a plan view of a stage unit according to one or more embodiments.

FIG. 15 is a schematic view illustrating an ink supply device according to one or more embodiments.

FIG. 16 is a flowchart of a printing method using an inkjet printing apparatus according to one or more embodiments.

FIG. 17 is a detailed flowchart illustrating an example of operation S100 of FIG. 16.

FIGS. 18 and 19 are schematic views illustrating operation S100 in FIG. 16.

FIG. 20 is a detailed flowchart illustrating an example of operation S200 of FIG. 16.

FIG. 21 is a schematic view illustrating operation S200 of FIG. 16.

FIGS. 22 to 24 are schematic views illustrating operation S200 of FIG. 21.

FIG. 25 is a detailed flowchart illustrating an example of operation S300 of FIG. 16.

FIG. 26 is a schematic view illustrating operation S300 of FIG. 16.

FIGS. 27 to 31 are schematic views illustrating operation S300 of FIG. 26.

FIG. 32 is a schematic view illustrating operation S400 of FIG. 16.

FIG. 33 is a schematic view of a light-emitting element according to one or more embodiments.

FIG. 34 is a plan view of a display device manufactured by a method according to one or more embodiments.

FIG. 35 is a partial cross-sectional view of a display device taken along the line I-I' of FIG. 34.

MODES OF THE INVENTION

Advantages and features of the present disclosure and methods of achieving the same will be clearly understood with reference to the accompanying drawings and embodiments described in detail below. However, the present disclosure is not limited to the embodiments to be disclosed below, but may be implemented in various different forms. The embodiments are provided in order to fully explain the present embodiments and fully explain the scope of the present embodiments for those skilled in the art. The scope of the present embodiments is only defined by the appended claims.

When an element or a layer is referred to as being formed "on" another element or another layer, the description includes the meaning of the element or the layer being directly formed on another element or another layer and still another element or still another layer being interposed between the two elements or the two layers. Like reference numerals refer to like elements throughout the specification.

It should be understood that, although the terms "first," "second," etc. may be used herein to describe various components, these components are not limited by these terms. The terms are only used to distinguish one component from another component. Therefore, it should be understood that a first component to be described below may be a second component within the technical scope of the present disclosure.

Hereinafter, the embodiments will be described with reference to the accompanying drawings.

FIG. 1 is a schematic perspective view of an inkjet printing apparatus according to one or more embodiments. FIG. 2 is a schematic plan view of the inkjet printing apparatus according to one or more embodiments.

An inkjet printing apparatus 1000 according to one or more embodiments may eject ink (e.g., predetermined ink) onto a target substrate and align particles dispersed in the ink, for example, particles such as dipoles, on the target substrate. Here, the inkjet printing apparatus 1000 may include a plurality of inspection units to eject the ink in an amount (e.g., predetermined amount) and to maintain the same number of particles in the ink in each process. The inspection units may inspect an amount of the ink ejected from the inkjet printing apparatus 1000 and the number of particles contained in the ink, and may feed back results of the inspection, thereby improving reliability of the inkjet printing apparatus 1000.

A first direction D1, a second direction D2, and a third direction D3 are defined in the drawings. The first direction D1 and the second direction D2 are coplanar and perpendicular to each other, and the third direction D3 is perpendicular to each of the first direction D1 and the second direction D2.

Referring to FIGS. 1 and 2, the inkjet printing apparatus 1000 according to one or more embodiments may include an inkjet head device 300, a discharge amount inspection unit 100, a particle count inspection unit 600, a stage unit 500, and an inspection stage unit 200.

The stage unit 500 provides a space in which a target substrate SUB is placed. The target substrate SUB may be placed on the stage unit 500 while a printing process is performed.

The overall planar shape of the stage unit 500 may correspond to a planar shape of the target substrate SUB. For example, when the target substrate SUB has a rectangular shape, the overall shape of the stage unit 500 may be a rectangular shape, and when the target substrate SUB has a circular shape, the overall shape of the stage unit 500 may be a circular shape. In the drawing, a rectangular stage unit 500 with a long side located in the first direction D1 and a short side located in the second direction D2 is illustrated.

The stage unit 500 may include a base frame 510, a stage 520 located on the base frame 510, and a probe unit 550 located on the base frame 510.

A detailed description of a structure of the stage unit 500 will be given below with reference to other drawings.

The inkjet head device 300 serves to print with ink I (see FIG. 5) on the target substrate SUB. The inkjet head device 300 may eject ink (e.g., predetermined ink) I onto the target substrate SUB when the inkjet printing apparatus 1000 is driven.

The inkjet printing apparatus 1000 may further include an ink supply unit such as an ink cartridge, and the ink I supplied from the ink supply unit may be ejected (discharged) toward the target substrate SUB through the inkjet head device 300.

The ink I may be provided in a solution state or in a colloidal state. The ink I may include a solvent SV (see FIG. 5), and a plurality of dipoles DP (see FIG. 5) contained in the solvent SV. For example, the solvent SV may be acetone, water, alcohol, toluene, propylene glycol (PG), propylene glycol methyl acetate (PGMA), or the like. The solvent SV may be a material that is vaporized or volatilized at room temperature or with heat. The plurality of dipoles DP may be dispersed in the solvent SV. The dipoles DP may be a solid material finally remaining on the target substrate SUB or on an inspection substrate ISUB after the solvent SV is removed.

The dipoles DP may be objects of which one end portion has a first polarity and the other end portion has a second polarity that is different from the first polarity. For example, the one end portions of the dipoles DP may have a positive polarity, and the other end portions of the dipoles DP may have a negative polarity. The dipoles DP having respective polarities at both end portions may receive electrical forces (e.g., an attractive force and a repulsive force) when placed in an electric field so that orientation thereof may be controlled.

The dipole DP may have a shape extending in one direction. The dipole DP may have a shape such as a nanorod shape, a nanowires shape, a nanotubes shape, or the like. As the dipoles DP contained in the ink I according to one or more embodiments, semiconductor nanorods, of which one end portion is doped with a first conductive type (e.g., p-type) impurity and of which the other end portion is doped with a second conductive type (e.g., n-type) impurity, may be applied.

The inkjet head device 300 may include a first support 310, an inkjet head unit 330, and a first heat treatment unit 370 that radiates first light $H_{11}$ and $H_{12}$ (see FIG. 12). The inkjet head unit 330 and the first heat treatment unit 370 may be mounted on the first support 310. The first support 310 may include a first horizontal support portion 311 and first vertical support portions 312. The inkjet head unit 330 and the first heat treatment unit 370 may be spaced a distance (e.g., predetermined distance) from the stage unit 500 in the third direction D3.

The discharge amount inspection unit 100 may include first sensing units 150 to inspect a discharge amount and to inspect an impact position of the ink I ejected from the inkjet head device 300. The discharge amount inspection unit 100 may include a second support 110 and the first sensing units 150. The second support 110 may include a second horizontal support portion 111 and second vertical support portions 112.

The particle count inspection unit 600 may include a second sensing unit 640 to inspect the number of particles contained in the ink I ejected from the inkjet head device 300. The particle count inspection unit 600 may include a third support 610, may include a second heat treatment unit 630 that is mounted on the third support 610 to radiate second light H2 (see FIG. 7), and may include the second sensing unit 640 located below the second heat treatment unit 630. The particle count inspection unit 600 may further include a light irradiation unit 650 located on the third support 610. The third support 610 may include a third horizontal support portion 611 and third vertical support portions 612.

The inspection stage unit 200 provides a space in which the inspection substrate ISUB is placed. The inspection substrate ISUB may be an inspection target substrate capable of inspecting (or testing) the inkjet head device 300 on the basis of the ink I ejected from the inkjet head device 300. For example, the inkjet printing apparatus 1000 according to one or more embodiments may perform a printing process on the target substrate SUB, and then may also eject the ink I onto the inspection substrate ISUB placed on the inspection stage unit 200 using the inkjet printing apparatus 1000 while the target substrate SUB is moved, and may inspect the ink I applied onto the inspection substrate ISUB using the discharge amount inspection unit 100 and the particle count inspection unit 600. That is, the inkjet printing apparatus 1000 according to one or more embodiments may perform a printing test process on the inspection substrate ISUB while the printing process is performed on the target substrate SUB. A set value of the inkjet printing apparatus 1000 may be adjusted using feedback of a result of inspecting the ink I ejected onto the inspection substrate ISUB.

A planar shape of the inspection stage unit 200 may be a rectangular shape. In the drawing, the inspection stage unit 200 having a rectangular shape with a long side extending in the first direction D1 and a short side extending in the second direction D2 is illustrated. However, the shape of the inspection stage unit 200 is not limited thereto and may be changed according to a planar shape of the inspection substrate ISUB.

The inkjet head device 300 may further include a third sensing unit 350. The third sensing unit 350 may be mounted on the first support 310. The third sensing unit 350 may inspect an alignment state of the ink I ejected from the inkjet head device 300, an amount of the discharged ink I, and the like. Further, the third sensing unit 350 may inspect whether nozzles NZ (see FIG. 19) included in an inkjet head 335 (see FIGS. 8 and 19) of the inkjet head unit 330, which will be described below, are clogged.

The particle count inspection unit 600, the discharge amount inspection unit 100, and the inkjet head device 300 of the inkjet printing apparatus 1000 may be sequentially located in the second direction D2. The particle count inspection unit 600, the discharge amount inspection unit 100, and the inkjet head device 300 may be located apart from each other in the second direction D2.

The inkjet printing apparatus 1000 may further include a stage moving unit RR that moves the stage unit 500 and/or the inspection stage unit 200. The stage unit 500 and the inspection stage unit 200 may be located on the stage moving unit RR. The stage moving unit RR may include a first rail RR1 and a second rail RR2, which extend in the second direction D2, and may reciprocate the stage unit 500 and/or the inspection stage unit 200 in the second direction D2. The stage unit 500 may perform a printing process on an entire region of the target substrate SUB while being moved in the second direction D2. Further, the inspection stage unit 200 may inspect the inkjet head device 300 on the basis of the ink I ejected from the inkjet head device 300 while being moved between the inkjet head device 300, the particle count inspection unit 600, and the discharge amount inspection unit 100 in the second direction D2.

The inkjet printing apparatus 1000 illustrated in FIGS. 1 and 2 is for describing an example of a configuration of an inkjet printing apparatus 1000 according to one or more embodiments, and a structure and arrangement of the inkjet printing apparatus 1000 are not limited to the inkjet printing apparatus 1000 illustrated in FIGS. 1 and 2. The inkjet printing apparatus 1000 may include more members and may have a structure that s different from the inkjet printing apparatus 1000 in FIGS. 1 and 2.

FIG. 3 is a schematic cross-sectional view of an inspection stage unit according to one or more embodiments.

Referring to FIGS. 1 to 3, the inspection stage unit 200 may be located on the first rail RR1 and the second rail RR2. The inspection stage unit 200 may be moved in the second direction D2 on the first rail RR1 and the second rail RR2, and may reciprocate between the inkjet head device 300 and the particle count inspection unit 600.

The inspection stage unit 200 according to one or more embodiments may include an adsorption device 210 and an upper substrate 220.

The upper substrate 220 may have a planar shape extending in the first direction D1. The inspection substrate ISUB may be placed on the upper substrate 220. In one or more embodiments, the inspection substrate ISUB may be glass, a film, or the like, but the type thereof is not particularly limited. Preferably, the inspection substrate ISUB may be an organic film or a transparent glass substrate.

The upper substrate 220 may be located on the adsorption device 210. The adsorption device 210 may serve to move the inspection substrate ISUB in the third direction D3 and may fix the inspection substrate ISUB onto the upper substrate 220 when the inspection substrate ISUB is placed on the upper substrate 220.

The upper substrate 220 may include a transparent material so that the second sensing unit 640 of the particle count inspection unit 600, which will be described below, may be located below the upper substrate 220 to measure the inspection substrate ISUB. At least a portion of the upper substrate 220 includes a transparent material, and thus the second sensing unit 640 may be located below a region overlapping the transparent region, and the number of dipoles DP located on the inspection substrate ISUB placed on the second sensing unit 640 may be measured. A detailed description thereof will be given below with reference to other drawings.

The adsorption device 210 may include a first adsorption device 211 and a second adsorption device 212. The first adsorption device 211 and the second adsorption device 212 may be respectively located under both end portions of the upper substrate 220 and may extend in the second direction D2. The first adsorption device 211 and the second adsorption device 212 may be located under a periphery of the upper substrate 220 and may be driven in the third direction D3. In one or more embodiments, the adsorption device 210 may be a vacuum device, a clamp device, or the like, but the present disclosure is not limited thereto.

The inspection stage unit 200 may further include a plurality of rollers WR1 and WR2. Because the plurality of rollers WR1 and WR2 are rotated on the upper substrate 220, the inspection substrate ISUB may be wound in the first direction D1. Therefore, the inspection substrate ISUB may be provided on, and/or removed from, the upper substrate 220 by the plurality of rollers WR1 and WR2.

FIG. 4 is a schematic plan layout of a discharge amount inspection unit and an inspection stage unit according to one or more embodiments. FIG. 5 is a schematic cross-sectional layout of the discharge amount inspection unit and the inspection stage unit according to one or more embodiments.

Referring to FIGS. 1, 4, and 5, the discharge amount inspection unit 100 may include a second support 110 and first sensing units 150.

The discharge amount inspection unit 100 may analyze the ink which is ejected onto the inspection substrate ISUB from the inkjet head device 300 and applied onto the inspection substrate ISUB, and may inspect a discharge amount and an impact position of the ink I ejected from the inkjet head device 300. A detailed description of a process of ejecting the ink I onto the inspection substrate ISUB (or target substrate SUB) from the inkjet head device 300 will be given below with reference to other drawings.

The second support 110 may include a second horizontal support portion 111 extending in a horizontal direction, and second vertical support portions 112 that are connected to respective end portions of the second horizontal support portion 111 and that extend in the third direction D3 that is a vertical direction. The extending direction of the second horizontal support portion 111 may be identical to the first direction D1 that is a long side direction of the inspection stage unit 200.

The first sensing units 150 may be located above the inspection stage unit 200. The first sensing units 150 may be mounted on the second support 110 at a distance (e.g., predetermined distance) from the inspection stage unit 200. The first sensing units 150 may be moved in the first direction D1 on the second horizontal support portion 111 of the second support 110.

The separation distance between the first sensing unit 150 and the inspection stage unit 200 may be adjusted within a range in which the first sensing unit 150 may have a certain interval from the inspection substrate ISUB when the inspection substrate ISUB is placed on the inspection stage unit 200 to secure a process (inspection) space.

The discharge amount inspection unit 100 may include a plurality of first sensing units 150. FIGS. 1 and 4 illustrate that four first sensing units 150 are located, but the present disclosure is not limited thereto. The first sensing units 150 may be spaced apart from the inspection stage unit 200 to detect a material (e.g., predetermined material) that is located on the inspection stage unit 200.

Each of the first sensing units 150 may include a first moving portion 151 that is connected to the second support 110 and moveable in the horizontal direction, a first support portion 153 located on one surface of the first moving portion 151, and a first sensor unit 155 located on the first support portion 153.

The first moving portion 151 may be mounted on the second horizontal support portion 111 of the second support 110 and may be moved in the first direction D1 that is the extending direction of the second horizontal support portion 111. Because the first moving portion 151 is moved in the first direction D1, the first support portion 153 mounted on the first moving portion 151 may also be moved in the first direction D1.

The first support portion 153 may be mounted on the first moving portion 151. The first support portion 153 may be located on a lower surface of the first moving portion 151 and may have a shape extending in the second direction D2. One end portion of the first support portion 153 may be connected to the first moving portion 151, and the other end portion in the second direction D2 may be connected to the first sensor unit 155.

The first sensor unit 155 may be located above the inspection stage unit 200. The first sensor unit 155 may be mounted on the first support portion 153 at a distance (e.g., predetermined distance) from the inspection stage unit 200. The first sensor unit 155 may be located above the inspection stage unit 200 to detect materials (e.g., predetermined materials) applied onto the inspection substrate ISUB placed on the inspection stage unit 200. The materials (e.g., predetermined materials) applied onto the inspection substrate ISUB may include the ink including a solvent SV, and dipoles DP dispersed in the solvent SV. Because the first moving portion 151 is moved in the first direction D1, the first sensor unit 155 may detect or photograph the materials (e.g., predetermined materials) applied onto each region of the inspection substrate ISUB.

In one or more embodiments, the first sensor unit 155 may be a high-resolution camera. When the first sensor unit 155 is a high-resolution camera, the first sensor unit 155 may be located above the inspection substrate ISUB onto which the ink I is applied, and may photograph the inspection substrate ISUB located therebelow to measure diameters or positions of the materials applied onto the inspection substrate ISUB and errors therebetween. However, the first sensor unit 155 is not limited to a high-resolution camera as long as it is a device capable of detecting a material applied onto the inspection substrate ISUB.

FIG. 6 is a schematic view illustrating ink applied onto an inspection substrate according to one or more embodiments, Hereinafter, a method of inspecting a discharge amount of the ink I applied onto an upper surface of the inspection substrate ISUB using the discharge amount inspection unit 100 will be described with reference to FIGS. 4 to 6.

It is suitable for the ink I ejected from the inkjet head device 300 to be the same amount of the ink I ejected onto the target substrate SUB to the same position even when a printing process is repeated several times. Therefore, before the ink I is ejected onto the target substrate SUB from the inkjet head device 300, a process of inspecting whether the same amount of the ink I is ejected onto the inspection substrate ISUB to the same position may be performed, and the set value of the inkjet printing apparatus 1000 may be adjusted according to a result of the inspection.

The first sensing units 150 may be located above the inspection substrate ISUB to measure a discharge amount for each nozzle NZ (see FIG. 10) using the ink I applied onto an upper surface of the inspection substrate ISUB. The discharge amount for each nozzle NZ may be measured by detecting a diameter of the ink I applied onto the inspection substrate ISUB. Further, the first sensing units 150 may be located above the inspection substrate ISUB to measure an application position for each nozzle NZ using the ink I applied onto the upper surface of the inspection substrate ISUB. The first sensing units 150 may measure an error by comparing reference set values with the diameter and application position of the ink I.

As described above, in one or more embodiments, the first sensor unit 155 of the first sensing unit 150 may include a high-resolution camera. When the first sensor unit 155 includes a high-resolution camera, the high-resolution camera may photograph the upper surface of the inspection substrate ISUB onto which the ink I is applied at the upper portion of the inspection substrate ISUB and may generate image data. The first sensing unit 150 may analyze the image data generated by the first sensor unit 155 and may calculate the diameter and application position of the ink I applied onto the upper surface of the inspection substrate ISUB to measure the diameter and application position of the ink I.

Further, the first sensing unit 150 may measure an area S1 of (see FIG. 31) of the ink I using the diameter of each ink I in order to calculate the number of particles contained in the dipoles DP using the particle count inspection unit 600, which will be described below. Data on the area of the ink measured by the first sensing unit 150 may be transmitted to the particle count inspection unit 600.

The first sensing units 150 may measure diameters $W_{I1}$ and $W_{I2}$ of the ink I applied onto the upper surface of the inspection substrate ISUB and may measure intervals $P_{I1}$ and $P_{I2}$ between two spots of the ink I. The measured diameters Wi and $W_{I2}$ of the ink I and the measured intervals $P_{I1}$ and $P_{I2}$ are compared with reference set values, and the discharge amount of the ink I ejected from the inkjet head device 300 and a position of an ink discharging member of the inkjet head device 300 may be adjusted to approximate the reference set values according to a result of the comparison.

For example, the measured data including the diameters $W_{I1}$ and $W_{I2}$ of the ink I and the intervals $P_{I1}$ and $P_{I2}$ measured by the first sensing units 150 may be transmitted to the inkjet head device 300, and the ink discharging members of the inkjet head device 300 may be aligned based on the transmitted data. A detailed description of a method of aligning the ink discharging members of the inkjet head device 300 will be given below with reference to other drawings.

As illustrated in FIG. 6, the diameters $W_{I1}$ and $W_{I2}$ and the intervals $P_{I1}$ and $P_{I2}$ of the ink I that is ejected from the inkjet head device 300 and applied onto the upper surface of the inspection substrate ISUB may not coincide with each other. The first sensing units 150 may detect such an error.

The discharge amount inspection unit 100 may measure the diameters Wm and W12 of the ink I applied onto the upper surface of the inspection substrate ISUB to primarily adjust the number of dipoles DP dispersed in the ink I that is ejected one time. When the diameters $W_{I1}$ and $W_{I2}$ of the ink I are different from each other, reliability of a product manufactured using the inkjet printing apparatus 1000 can be reduced. Therefore, the discharge amount inspection unit 100 may detect such an error and adjust the amount of the ink I ejected from the inkjet head device 300 to match the diameters $W_{I1'}$ and $W_{I2'}$ of the ink I, and thus the number of dipoles DP contained in the ink I that is ejected one time can be maintained.

The inspection using the first sensing unit 150 and the process of aligning the inkjet head device 300 may be repeated so that the diameters $W_{I1'}$ and $W_{I2'}$ and the intervals $P_{I1'}$ and $P_{I2'}$ of the ink I match the reference set values or approximate the reference set values. The reference set values may be "feature values" that is suitable for the inkjet head device 300 that ejects the ink I including the dipoles DP in driving the inkjet printing apparatus 1000. For example, the reference set values may include the amount of the ink I ejected from each nozzle NZ of the inkjet head device 300, the application position of the ink I, the number of dipoles DP contained in the ink I, and the like.

FIG. 7 is a schematic cross-sectional layout of a particle count inspection unit and an inspection stage unit according to one or more embodiments.

Referring to FIGS. 1 and 7, the particle count inspection unit 600 may include a third support 610, a second heat treatment unit 630, and a second sensing unit 640.

The particle count inspection unit 600 may inspect the number of dipoles DP contained in the ink I that is ejected onto the inspection substrate ISUB from the inkjet head device 300 and applied onto the inspection substrate ISUB.

The third support 610 may include the third horizontal support portion 611 extending in the horizontal direction, and the third vertical support portions 612 that are connected to respective end portions of the third horizontal support portion 611 to extend in the third direction D3 that is the vertical direction. The extending direction of the third horizontal support portion 611 may be identical to the first direction D1 that is the long side direction of the inspection stage unit 200.

The second heat treatment unit 630 may be located above the inspection stage unit 200. The second heat treatment unit 630 may be mounted on the third support 610 at a distance (e.g., predetermined distance) from the inspection stage unit 200. The second heat treatment unit 630 may be mounted on the third horizontal support portion 611 of the third support 610. Although not illustrated, the second heat treatment unit 630 may include a separate moving member to be moved in the first direction D1 and/or the third direction D3 on the third support 610.

The separation distance between the second heat treatment unit 630 and the inspection stage unit 200 may be adjusted within a range in which, when the inspection substrate ISUB is placed on the inspection stage unit 200, the second light H2 radiated from the second heat treatment unit 630 may be secured to be radiated to the entire region of the inspection substrate ISUB with a certain interval from the inspection substrate ISUB.

The second heat treatment unit 630 may generate thermal energy by irradiating the inspection substrate ISUB onto which the ink I is applied with the second light H2. The second heat treatment unit 630 may include a device for generating heat. The device for generating the heat is not particularly limited. In one or more embodiments, the second light H2 may include light in an infrared (IR) wavelength band and the second heat treatment unit 630 may include an IR irradiation device. The solvent SV of the ink I applied onto the upper surface of the inspection substrate ISUB may be removed by volatilization or vaporization due to the thermal energy generated by the second heat treatment unit 630 by irradiating the inspection substrate ISUB with the second light H2. Therefore, the plurality of dipoles DP may remain in the inspection substrate ISUB.

The second sensing unit 640 may be located below the inspection stage unit 200. The second sensing unit 640 may be located below the inspection stage unit 200 at a distance (e.g., predetermined distance) from the inspection substrate ISUB.

The second sensing unit 640 may include a camera. Hereinafter, the case in which the second sensing unit 640 is a camera unit 640 will be described. When the second sensing unit 640 includes a camera, the second sensing unit 640 may be located below the inspection substrate ISUB and may photograph a bottom surface (lower surface) of the inspection substrate ISUB to generate image data. When the inspection substrate ISUB includes a transparent material, the image data that is generated by the second sensing unit 640 by being photographed from under the inspection substrate ISUB may include a plurality of dipoles DP.

The light irradiation unit 650 may be located above the inspection stage unit 200 to irradiate the inspection stage unit 200 with light. That is, the light irradiation unit 650 may irradiate the inspection substrate ISUB with the light on the inspection substrate ISUB. The light radiated by the light irradiation unit 650 may be light in a visible light band.

When the light irradiation unit 650 located above the inspection substrate ISUB irradiates the inspection substrate ISUB with the light, the second sensing unit 640 located below the inspection substrate ISUB may generate image data by photographing a partial region of the inspection substrate ISUB on which the plurality of dipoles DP are located. The image data generated by the second sensing unit 640 may be an image represented by light and dark. The dark regions may be regions corresponding to the plurality of dipoles DP.

The particle count inspection unit 600 may compare an area S1 (see FIG. 31) of the ink I that is measured and transmitted by the first sensing unit 150 as described above with an area S2 (see FIG. 31) of regions corresponding to the dipoles DP measured from the image data. The particle count inspection unit 600 may calculate the number of dipoles on the basis of the area S1 of the ink I and the area S2 of the regions corresponding to the dipoles DP and may compare the calculated number of dipoles with a reference set value. The number of dipoles DP supplied to the inkjet head device 300 may be secondarily adjusted by adjusting an ink supply device 400 that will be described below according to a result of the comparison of the number of dipoles and the reference set value.

FIG. 8 is a schematic plan layout of an inkjet head unit and an inspection stage unit according to one or more embodiments. FIG. 9 is a bottom view of the inkjet head unit according to one or more embodiments.

FIG. 8 is a plan view of the inkjet head device 300 from the third direction D3, for example, from above. It should be noted that FIG. 9 is a bottom view of the inkjet head unit 330 from below.

Referring to FIGS. 1 and 8, the inkjet head device 300 according to one or more embodiments may include a first support 310, an inkjet head unit 330, a first heat treatment unit 370, and a third sensing unit 350.

The first support 310 may include a first horizontal support portion 311 extending in the horizontal direction, and first vertical support portions 312 that are connected to respective end portions of the first horizontal support portion 311 to extend in the third direction D3 that is the vertical direction. The extending direction of the first horizontal support portion 311 may be identical to the first direction D1 that is the extending direction of the second horizontal support portion 111 described above.

The inkjet head unit 330 serves to eject the ink I including the dipoles DP onto the target substrate SUB and/or the inspection substrate ISUB. The inkjet head unit 330 may be located above the stage unit 500. Although not illustrated in FIG. 8, the inkjet head unit 330 may be located above the inspection stage unit 200 while a process of inspecting the ink I applied onto the inspection substrate ISUB is performed.

The inkjet head unit 330 may be mounted on the first horizontal support portion 311 of the first support 310. The inkjet head unit 330 may be mounted on the first horizontal support portion 311 and located to protrude from the first horizontal support portion 311 toward one side thereof. For example, the inkjet head unit 330 may be located to protrude from the first horizontal support portion 311 toward one side thereof in the second direction D2.

The first heat treatment unit 370 may serve to irradiate the target substrate SUB and/or the inspection substrate ISUB onto which the ink I is applied with the first light H1 and may remove the solvent SV of the ink I by volatilization or vaporization.

The first heat treatment unit 370 may be mounted on the first horizontal support portion 311 of the first support 310. The first heat treatment unit 370 may be mounted on the first horizontal support portion 311 and may be located to protrude from the first horizontal support portion 311 toward another side opposite to the one side. For example, the first heat treatment unit 370 may be located to protrude from the first horizontal support portion 311 in the opposite direction, that is, the second direction D2. Therefore, the first horizontal support portion 311 of the first support 310 may be located between the inkjet head unit 330 and the first heat treatment unit 370.

Hereinafter, the inkjet head unit 330 of the inkjet head device 300 according to one or more embodiments will be described in detail with reference to FIGS. 8 and 9.

The inkjet head unit 330 may be mounted on the first horizontal support portion 311 of the first support 310 at a distance (e.g.; predetermined distance) from the stage unit 500 and/or the inspection stage unit 200. The separation distances between the inkjet head unit 330 and the stage unit 500 and/or the inspection stage unit 200 may be adjusted within a range in which, when the target substrate SUB is placed on the stage unit 500 or the inspection substrate ISUB is placed on the inspection stage unit 200, the inkjet head unit 330 has a certain interval from the target substrate SUB and/or the inspection substrate ISUB to ensure a space for the printing process.

The inkjet head unit 330 may be connected to a separate ink storage (not illustrated) to receive the ink I and to eject the ink I onto the target substrate SUB and/or the inspection substrate ISUB through the inkjet head 335, which will be described below.

Although one inkjet head unit 330 is illustrated in the drawing, the present disclosure is not limited thereto. For example, in a process of providing a plurality of types of ink I onto the target substrate SUB, the same number of inkjet head units 330 having the same type as the ink I may be located on the target substrate SUB.

The inkjet head unit 330 may include a head base 331, a plurality of jig units 333 located on a bottom surface of the head base 331, and at least one inkjet head 335 that is located on the jig unit 333 and that includes a plurality of nozzles NZ.

The head base 331 of the inkjet head unit 330 may be mounted on the first horizontal support portion 311 of the first support 310. The head base 331 may be spaced by an interval (e.g., predetermined interval) from the stage unit 500 in the third direction D3. The head base 331 may have a shape extending in the first direction D1. The head base 331 may further include a moving member to be moved in the extending direction of the first horizontal support portion 311, that is, the first direction D1.

The plurality of jig units 333 may be located on one surface of the head base 331, for example, the bottom surface of the head base 331. At least one inkjet head 335 is located on each jig unit 333. The plurality of jig units 333 may be located apart from each other in one direction. The plurality of jig units 333 may be located in one direction and arranged in one column or a plurality of columns. The drawing illustrates that the jig units 333 are located in two columns and the jig units 333 in each column are alternately located. However, the present disclosure is not limited thereto, and the jig units 333 may be arranged in a larger number of columns and located to overlap each other without being alternately located. A shape of the jig unit 333 is not particularly limited, and the jig unit 333 may have, for example, a quadrilateral shape.

The inkjet head unit 330 may further include a plurality of head-driving units AM1 and AM2 capable of moving the respective jig units 333 in one direction and the other direction. The plurality of head-driving units AM1 and AM2 may adjust a position of each jig unit 333 and may adjust an interval between the jig units 333. By adjusting the interval between the jig units 333 using the head-driving units AM1 and AM2, an impact position of the ink I ejected from the inkjet head 335 located on the jig unit 333 may be adjusted.

The inkjet head 335 is located on the jig unit 333. At least one inkjet head 335 may be located on the jig unit 333. In one or more embodiments, two inkjet heads 335 may form one pack and may be located on one jig unit 333. However, the number of inkjet heads 335 included in one pack is not limited thereto, and the number of inkjet heads 335 included in one pack may be, for example, one to five.

Further, although it is illustrated that one inkjet head unit 330 includes several jig units 333 and inkjet heads 335 in the drawing, the number of the jig units 333 and inkjet heads 335 included in the inkjet head unit 330 is not limited thereto.

FIG. 10 is a schematic view illustrating ink being ejected from an inkjet head according to one or more embodiments.

Referring to FIG. 10, the inkjet head 335 may include an inner pipe IP and a plurality of nozzles NZ. Each nozzle NZ positioned in a bottom surface of the inkjet head 335 may be connected to the inner pipe IP of the inkjet head 335. The inkjet head 335 may receive the ink I from the head base 331 through the inner pipe IP, and the received ink I may flow through the inner pipe IP and may be ejected through the respective nozzles NZ. The ink I ejected through the respective nozzles NZ may be supplied onto the upper surface of the target substrate SUB and/or the inspection substrate ISUB.

An amount of the ink I ejected through the nozzles NZ may be adjusted according to a voltage applied to each nozzle NZ. In one or more embodiments, the amount of the ink I that is ejected from each nozzle NZ one time may range from 1 to 50 picoliters (pi), but the present disclosure is not limited thereto.

FIG. 11 is a schematic cross-sectional view illustrating an inkjet head unit being inspected by a third sensing unit of an inkjet head device according to one or more embodiments.

Referring to FIGS. 1, 8, and 11, the third sensing unit 350 may be mounted on the first support 310. The third sensing unit 350 may serve to inspect an alignment degree of ink discharging members included in the inkjet head unit 330, an amount of the ejected ink I, and the like. Further, the third sensing unit 350 may inspect whether the nozzles NZ of the inkjet head 335 are clogged.

The third sensing unit 350 may include a sensor moving portion 351, a sensor support portion 353 located on one surface of the sensor moving portion 351, and a third sensor unit 355 located on the sensor support portion 353.

The sensor moving portion 351 may be mounted on the first horizontal support portion 311. The sensor moving portion 351 may be moved in the first direction D1 that is an extending direction of the inkjet head unit 330. The sensor moving portion 351 may serve to move the third sensor unit 355 in the first direction D1 that is the extending direction of the inkjet head unit 330.

The sensor support portion 353 may be located under the sensor moving portion 351 and may have a shape extending in the second direction D2. One end portion of the sensor support portion 353 may be connected to the sensor moving portion 351, and the third sensor unit 355 may be located on an upper surface of another end portion in the second direction D2. The third sensing unit 350 may be located to substantially protrude from the first support 310 in the second direction D2. For example, similarly to the inkjet head unit 330, the third sensing unit 350 may be located to protrude toward one side of the first horizontal support portion 311 in the second direction D2.

The third sensor unit 355 is located on an upper surface of the sensor support portion 353. The third sensor unit 355 may be located below the inkjet head 335 to face the inkjet head 335.

The third sensor unit 355 may be moved in the extending direction of the inkjet head unit 330 by the sensor moving portion 351. The third sensor unit 355 may be moved in the extending direction of the inkjet head unit 330 below the inkjet head unit 330 to inspect the positions or alignment state of the inkjet heads 335 located on a bottom surface of the inkjet head unit 330. Further, the third sensor unit 355 may monitor the amount of the ink I ejected from the inkjet heads 335, stains or dried ink I generated on the inkjet head 335, and the like.

The drawing illustrates that the third sensor unit 355 includes one detection member, but the present disclosure is not limited thereto. The third sensor unit 355 may have one of various shapes to inspect the alignment degree of the inkjet heads 335. For example, when the inkjet heads 335 are arranged in a plurality of columns, the third sensor unit 355 may also include a plurality of detection members, and the plurality of detection members may be arranged in a plurality of columns.

Hereinafter, a method in which the third sensing unit inspects the inkjet head unit and drives the inkjet head unit on the basis of a result of the inspection will be described with reference to FIGS. 9 and 11.

Referring to FIGS. 9 and 11, before the inkjet heads 335 eject the ink I onto the target substrate SUB or the inspection substrate ISUB, the third sensing unit 350 may inspect the alignment degree of the inkjet head 335 of the inkjet head unit 330, stains generated on the inkjet heads 335, and the like.

For example, each inkjet head 335 may further include dummy nozzles DN positioned in both sides of a lower surface of the inkjet head 335. The third sensing unit 350 may measure the alignment state of the inkjet heads 335 using the positions of the detected dummy nozzles DN. For example, the third sensing unit 350 may detect the positions of the dummy nozzle DN positioned on both sides of the lower surface of each inkjet head 335 and may measure intervals HP1 and HP2 between the positions of the dummy nozzles DN of the inkjet heads 335 located adjacent to each other. The alignment state of the inkjet heads 335 may be indirectly measured using the measured intervals HP1 and HP2 between the dummy nozzles DN.

The inkjet head unit 330 may align the inkjet heads 335 on the basis of information measured by the first sensing unit 150 and the third sensing unit 350. For example, the inkjet head unit 330 may drive the head-driving units AM1 and AM2 to realign the jig units 333 and the inkjet heads 335 on the basis of the diameters $W_{I1}$ and $W_{I2}$ and the intervals $P_{I1}$ and $P_{I2}$ of the ink I applied onto the inspection substrate ISUB, which are measured by the first sensing unit 150 of the discharge amount inspection unit 100, and the alignment state of the inkjet heads 335 measured by the third sensing unit 350 of the inkjet head device 300.

A first head-driving unit AM1 may be positioned on the jig unit 333 in the first direction D1. The first head-driving unit AM1 may be a driving unit for moving the jig units 333 and the inkjet heads 335 in the first direction D1 or an X-axis direction in order to align the jig units 333 and the inkjet heads 335. A second head-driving unit AM2 may be positioned on the jig unit 333 in the second direction D2. The second head-driving unit AM2 may be a driving unit for moving the jig units 333 and the inkjet heads 335 in the second direction D2 or a Y-axis direction in order to align the jig units 333 and the inkjet heads 335.

Meanwhile, the third sensing unit 350 may monitor the state of the inkjet heads 335, the amount of the ejected ink I, or the like. Although not illustrated in the drawing, the inkjet head device 300 may further include a cleaning unit for cleaning the nozzles NZ of the inkjet head 335. The cleaning unit may perform a process of cleaning the inkjet heads 335 on the basis of the information detected by the third sensing unit 350 among the processes of the inkjet printing apparatus 1000. For example, when the third sensing unit 350 detects stains generated on the inkjet heads 335 or clogging of the nozzles NZ, the cleaning unit may perform the process of cleaning the nozzles NZ of the inkjet heads 335.

FIG. 12 is a cross-sectional view of a first heat treatment unit according to one or more embodiments. FIG. 13 is a schematic view illustrating driving of the heat treatment unit according to one or more embodiments.

Referring to FIGS. 1, 8, and 12, the first heat treatment unit 370 may include a base portion 371 and first heat treatment units 373 and 375 that radiate first light H1. The first light H1 may include 1-1 light $H_{11}$ and 1-2 light $H_{12}$, and the first heat treatment units 373 and 375 may include a first main heat treatment unit 373 that radiates the 1-1 light $H_{11}$ and a first auxiliary heat treatment unit 375 that radiates the 1-2 light $H_{12}$.

The base portion 371 may be mounted on the first horizontal support portion 311 of the first support 310 and may be located to protrude toward the other side of the first horizontal support portion 311 in the second direction D2.

The base portion 371 may have a shape extending in the first direction D1 and may provide a space in which the first main heat treatment unit 373 and the first auxiliary heat treatment unit 375 are located. The base portion 371 may further include a moving member for covering one side of the target substrate SUB, for example, one side extending in the first direction D1.

The first main heat treatment unit 373 and the first auxiliary heat treatment unit 375 may be located under the base portion 371. The first main heat treatment unit 373 and the first auxiliary heat treatment unit 375 may be located below the base portion 371 at a distance (e.g., predetermined distance) from the target substrate SUB. The first main heat treatment unit 373 and the first auxiliary heat treatment unit 375 may be spaced the distance (e.g., predetermined distance) from the target substrate SUB so that other members located on the target substrate SUB are not damaged by the first light H1 radiated from the first main heat treatment unit 373 and the first auxiliary heat treatment unit 375.

The first main heat treatment unit 373 may generate thermal energy by irradiating the target substrate SUB located therebelow with the 1-1 light $H_{11}$. The first main heat treatment unit 373 may include a device for generating heat. For example, the first main heat treatment unit 373 may include an IR irradiation device. The 1-1 light $H_{11}$ may include infrared light, and the first main heat treatment unit 373 may include an IR irradiation device. The solvent SV of the ink I applied onto the upper surface of the target substrate SUB may be removed due to the thermal energy generated by the first main heat treatment unit 373 irradiating the target substrate SUB with the 1-1 light $H_{11}$.

A shielding device may be further located on the first main heat treatment unit 373. The shielding device may serve to reduce or prevent damage to the target substrate SUB by partially shielding the 1-1 light $H_{11}$ radiated from the first main heat treatment unit 373.

The first auxiliary heat treatment unit 375 may irradiate the target substrate SUB located therebelow with the 1-2 light $H_{12}$ to transmit an electrical force to the dipoles DP located on the target substrate SUB. For example, the first auxiliary heat treatment unit 375 may include an ultraviolet (UV) lamp. The 1-2 light $H_{12}$ may include ultraviolet light, and the first auxiliary heat treatment unit 375 may include a UV lamp. The dipoles DP located on the target substrate SUB may be biased and aligned due to the energy generated by the first auxiliary heat treatment unit 375 irradiating the target substrate SUB with the 1-2 light $H_{12}$.

Referring to FIGS. 1, 8, and 13, the ink I including the solvent SV (see FIG. 5) and the dipoles DP may be applied onto the upper surface of the target substrate SUB, which is placed on the stage unit 500 and moved in a direction that is opposite to the second direction D2 to pass though the inkjet head unit 330. The target substrate SUB passing through the inkjet head unit 330 may be moved in the direction that is opposite to the second direction D2 to pass through the first heat treatment unit 370.

The solvent SV of the ink I may be removed, and only the dipoles DP may remain on the upper surface of the target substrate SUB passing through the first heat treatment unit 370. The solvent SV may be removed from the ink I applied onto the upper surface of the target substrate SUB positioned in an overlap region of the first main heat treatment unit 373. That is, while the stage unit 500 is moved in the direction that is opposite to the second direction D2, the solvent SV contained in the ink I applied onto the upper surface of the target substrate SUB may be sequentially removed in the second direction D2.

Therefore, because the stage unit 500 passes through the first heat treatment unit 370 in the direction that is opposite to the second direction D2, the 1-1 light $H_{11}$ may be sequentially radiated onto the target substrate SUB in the second direction D2. Therefore, when the stage unit 500 is moved in the direction that is opposite to the second direction D2 and passes through the first heat treatment unit 370, the solvent SV of the ink I applied onto the target substrate SUB may be sequentially removed while the stage unit 500 is moved. Therefore, as illustrated in FIG. 13, the solvent SV may be removed (a dotted line region) so that the dipoles DP may be located in a partial region of the target substrate SUB passing through the first heat treatment unit 370.

Meanwhile, although not illustrated in the drawing, the stage unit 500 may further include a control device for detecting a temperature of the upper portion of the target substrate SUB and adjusting the temperature. When the temperature on the target substrate SUB and around the target substrate SUB is increased to a certain level due to the first light H1 radiated from the first heat treatment unit 370, the control device may control the temperature of the target substrate SUB to be lowered.

In the inkjet head device 300 according to one or more embodiments, the inkjet head unit 330 may be located on one side of the first support 310 in one direction, and the first heat treatment unit 370 may be located on the other side of the first support 310 in one direction. The target substrate SUB placed on the stage unit 500 may sequentially pass through the inkjet head unit 330 and the first heat treatment unit 370 while being moved in one direction. Therefore, while the printing process is performed by the inkjet head unit 330, a process of drying the solvent SV contained in the ink I may be concurrently or substantially simultaneously performed. Therefore, a time for which the printing process is performed can be reduced and process efficiency can be improved.

FIG. 14 is a plan view of a stage unit according to one or more embodiments.

Referring to FIGS. 1, 2, and 14, the stage unit 500 may include a base frame 510, a stage 520, probe units 550, and aligners 580.

The base frame 510 may support members included in the stage unit 500. For example, the stage 520 and the probe units 550 may be located on the base frame 510.

The base frame 510 may be located on the first rail RR1 and the second rail RR2 and may reciprocate while being moved in the second direction D2 in the inkjet printing apparatus 1000. Although not illustrated in the drawing, a moving member (e.g., predetermined moving member) may be located on a lower surface of the base frame 510, and the moving member may be fastened to the first and second rails RR1 and RR2 to move the base frame 510 in one direction. The base frame 510 may be moved according to the process sequence of the inkjet printing apparatus 1000, and each unit or device may be driven according to the movement of the base frame 510 during the process of the inkjet printing apparatus 1000.

The stage 520 may be located on the base frame 510. The stage 520 may provide a space in which the target substrate SUB is placed. Further, the aligners 580 may be located on the stage 520.

The overall planar shape of the stage 520 may follow a planar shape of the target substrate SUB. For example, when the target substrate SUB is rectangular in a plan view, the planar shape of the stage 520 may have a rectangular shape as illustrated in the drawing, and when the target substrate SUB is circular in a plan view, the stage 520 may also have a circular planar shape.

The aligners 580 may be installed on the stage 520 to align the target substrate SUB placed on the stage 520. The aligner 580 may be located on each side of the stage 520, and a region surrounded by the plurality of aligners 580 may be a region in which the target substrate SUB is placed. The drawings illustrate that two aligners 580 are located on each side of the stage 520 and a total of eight aligners 580 are located on the stage 520, but the present disclosure is not limited thereto, and the number and arrangement of the aligners 580 may vary according to the shape or type of the target substrate SUB.

The probe unit 550 may be located on the base frame 510. The probe unit 550 may serve to form an electric field on the target substrate SUB provided on the stage 520. The probe unit 550 may extend in the second direction D2, and the extending length of the probe unit 550 may cover the entire target substrate SUB. The size and shape the probe unit 550 may vary according to those of the target substrate SUB.

The probe unit 550 may transmit electrical signals and may include a probe driving unit 553, probe pads 558 that are connected to the probe driving unit 553 and capable of being brought into contact with the target substrate SUB, and a plurality of probe jigs 551 and 552 that are connected to the probe pads 558.

The probe driving unit 553 may be located on the base frame 510 to move the probe pads 558. In one or more embodiments, the probe driving unit 553 may move the probe pads 558 in the horizontal direction and the vertical direction, for example, the first direction D1 that is the horizontal direction and the third direction D3 that is the vertical direction. The probe pads 558 may be connected to or separated from the target substrate SUB by driving the probe driving unit 553. Among the processes of the inkjet printing apparatus 1000, in a process of forming an electric field on the target substrate SUB, the probe driving unit 553 may be driven to connect the probe pads 558 to the target substrate SUB, and in the remaining processes, the probe driving unit 553 may be re-driven to separate the probe pads 558 from the target substrate SUB.

The probe pads 558 may form an electric field on the target substrate SUB using the electrical signals transmitted from the probe jigs 551. The probe pads 558 may be connected to the target substrate SUB to transmit the electrical signals and form an electric field on the target substrate SUB. For example, the probe pad 558 may be brought into contact with an electrode or a power pad of the target substrate SUB, and the electrical signals of the probe jigs 551 may be transmitted to the electrode or the power pad. The electric field may be formed on the target substrate SUB using the electrical signals transmitted to the target substrate SUB.

However, the present disclosure is not limited thereto, and the probe pad 558 may be a member that forms an electric field using electrical signals transmitted from the probe jigs 552. That is, when the probe pads 558 form an electric field by receiving the electrical signals, the probe pads 558 may not be connected to the target substrate SUB.

The shape of the probe pad 558 is not particularly limited, and in one or more embodiments, the probe pad 558 may have a shape extending in one direction to cover the entire target substrate SUB.

The probe jig 551 may be connected to the probe pad 558 and connected to a separate voltage application device. The probe jig 551 may transmit an electrical signal transmitted from the voltage application device to the probe pad 558 to form an electric field on the target substrate SUB. The electrical signal transmitted to the probe jig 551 may be a voltage for forming an electric field, for example, an alternating current (AC) voltage.

Although it is illustrated that two probe jigs 551 are located in the drawing, the probe unit 550 may include a larger number of probe jigs 551 to form an electric field having a higher density on the target substrate SUB.

The probe unit 550 according to one or more embodiments is not limited thereto. Although it is illustrated that the probe unit 550 is included in the stage unit 500 and located on the base frame 510 in the drawing, the probe unit 550 may be located as a separate device in some cases. As long as the stage unit 500 can include a device capable of forming an electric field to form an electric field on the target substrate SUB, a structure or arrangement thereof is not limited.

FIG. 15 is a schematic view illustrating an ink supply device according to one or more embodiments.

The ink supply device 400 may serve to supply prepared ink I to the inkjet head device 300. When the dipoles DP in the ink I are manufactured in a dispersed state, the prepared ink I may be stored or transmitted to be supplied to the inkjet head device 300 of the inkjet printing apparatus 1000. As illustrated in the drawing, the ink supply device 400 may be connected to the inkjet head device 300.

Referring to FIG. 15, the ink supply device 400 may include an ink tank 410, an ink stirrer 420, an ink storage 430, and a circulation pump 450.

The ink tank 410 may serve to store the prepared ink I and to supply the prepared ink I to the ink stirrer 420. The shape of the ink tank 410 is not particularly limited, and in one or more embodiments, the ink tank 410 may be an ink cartridge, an ink vessel, or the like. Although not illustrated in the drawings, the ink tank 410 may further include a pneumatic forming device capable of transmitting a pressure for supplying the ink I to the ink stirrer 420.

The ink stirrer 420 may serve to stir the ink I supplied from the ink tank 410, may re-disperse the dipoles DP, and may transmit the ink I to the ink storage 430. The dipoles DP may include a material having a relatively high specific gravity to be precipitated or to sink over time in the prepared ink I. The ink stirrer 420 may stir the ink I to re-disperse the dipoles DP precipitated in the ink I before the ink I is supplied to the ink storage 430.

In one or more embodiments, the ink stirrer 420 may include a stirring device 425 to disperse the dipoles DP in the ink I. The type of the stirring device 425 is not particularly limited. For example, the stirring device 425 may be a magnetic stirrer, a propeller stirrer, or the like. In the drawing, a magnetic stirrer is illustrated, and the stirring device 425 may re-disperse the dipoles DP in the ink I supplied from the ink tank 410.

The ink storage 430 may supply the ink I supplied from the ink stirrer 420 to the inkjet head device 300. The ink storage 430 may perform substantially the same function as the ink tank 410, and may receive the ink I through the ink stirrer 420 that stirs the prepared ink I. Accordingly, the ink storage 430 may supply the ink I including the dipoles DP having a relatively high degree of dispersion to the inkjet head device 300. The inkjet head device 300 may control the number or dispersion degree of dipoles DP contained in the ink I ejected from the inkjet head 335 one time by receiving the ink I through the ink storage 430 without directly receiving the ink I from the ink tank 410. That is, it is possible to maintain substantially uniform quality of the ink I according to the process of the inkjet printing apparatus 1000.

The circulation pump 450 may have one end connected to the inkjet head device 300 and another end connected to the ink stirrer 420 to circulate the ink I in the inkjet printing apparatus 1000. Among the processes of the inkjet printing apparatus 1000, when the number of dipoles DP applied onto the inspection substrate ISUB, that is measured by the particle count inspection unit 600, is smaller than a reference set value, the circulation pump 450 may be driven and may transmit the ink I of the inkjet head device 300 to the ink stirrer 420. That is, the circulation pump 450 may receive information on the number of dipoles DP measured by an alignment inspection device 700 and may circulate the ink I in the ink stirrer 420, the ink storage 430, and the inkjet head device 300 in order to maintain the quality of the ink I supplied to the inkjet head device 300. Accordingly, the ink I may be supplied to the inkjet head device 300 using feedback of the information provided from the particle count inspection unit 600.

The inkjet printing apparatus 1000 according to one or more embodiments may include a first sensing unit 150, a second sensing unit 640, and a third sensing unit 350. The first to third sensing units 150, 640, and 350 may inspect and monitor the state of the inkjet head 335 included in the inkjet head unit 330 using the inspection substrate ISUB in real time while the printing process of printing with the ink I on the target substrate SUB is performed. For example, the first sensing unit 150, the second sensing unit 640, and the third sensing unit 350 may each perform an operation of comparing the measured information with a reference set value, and accordingly, the members of the inkjet printing apparatus 1000 may be controlled. For example, data including information on the discharge amount of the ink I measured by the first sensing unit 150, information on the number of particles of the dipoles DP measured by the second sensing unit 640, and information on the alignment degree of the inkjet head 335 measured by the third sensing unit 350 may be transmitted to the inkjet head device 300. The inkjet head device 300 may receive the above pieces of information, may adjust the alignment state of the inkjet head 335 that ejects the ink I or clean the nozzles NZ, and may adjust the degree of dispersion of the dipoles DP in the provided ink I.

Accordingly, the inkjet printing apparatus 1000 according to one or more embodiments may include at least one sensing unit 150, 350, or 640 to detect errors that may occur during the process of the inkjet printing apparatus 1000 in real time. Each of the sensing units 150, 350, and 640 may detect errors and defects that occur during the process and may compensate for the errors and defects concurrently or substantially simultaneously while performing the process. Accordingly, in the inkjet printing apparatus 1000, the quality of the target substrate SUB including the finally manufactured dipoles DP can be maintained even when the process is repeated several times.

Further, the inkjet head device 300 of the inkjet printing apparatus 1000 according to one or more embodiments may include a first heat treatment unit 370 and an inkjet head unit 330, and the first heat treatment unit 370 and the inkjet head unit 330 may be sequentially located in one direction. Therefore, in the inkjet printing apparatus 1000, the movement of the target substrate SUB may be reduced or minimized while the process is performed after the ink I is ejected onto the target substrate SUB and the solvent SV of the ink I is removed. Accordingly, the process time of the inkjet printing apparatus 1000 can be reduced, and for example, the ink I may be ejected onto the target substrate SUB and then may continuously pass through the first heat treatment unit 370 to volatilize the solvent SV, thereby reducing or preventing the likelihood of misalignment of the dipoles DP.

Further, the particle count inspection unit 600 of the inkjet printing apparatus 1000 according to one or more embodiments may include a second heat treatment unit 630 to directly measure the number of dipoles DP remaining after the solvent SV of the ink I applied onto the inspection substrate ISUB is dried using the second heat treatment unit 630. On the other hand, in a method of indirectly calculating the number of dipoles DP by measuring an area or volume of the ink I applied onto the substrate without removing the solvent SV, the area or volume of the ink I may not be accurately calculated due to a measurement time difference caused by a volatilization characteristic of the solvent SV. Therefore, a measurement error rate of the number of dipoles DP measured using the particle count inspection unit 600 can be reduced as compared to that of the number of dipoles DP indirectly calculated (or measured) from the area or volume of the ink I, thereby improving the reliability of the inspection.

Hereinafter, a printing method using the inkjet printing apparatus 1000 according to one or more embodiments described above will be described. In the following one or more embodiments, descriptions of the same components as the embodiments that have already been described will be omitted or simplified, and differences therebetween will be mainly described.

FIG. 16 is a flowchart of a printing method using an inkjet printing apparatus according to one or more embodiments. FIG. 17 is a detailed flowchart illustrating an example of operation S100 of FIG. 16. FIGS. 18 and 19 are schematic views illustrating operation S100 in FIG. 16. FIG. 20 is a detailed flowchart illustrating an example of operation S200 of FIG. 16. FIG. 21 is a schematic view illustrating operation S200 of FIG. 16. FIGS. 22 to 24 are schematic views illustrating operation S200 of FIG. 21. FIG. 25 is a detailed flowchart illustrating an example of operation S300 of FIG. 16. FIG. 26 is a schematic view illustrating operation S300 of FIG. 16. FIGS. 27 to 31 are schematic views illustrating operation S300 of FIG. 26. FIG. 32 is a schematic view illustrating operation S400 of FIG. 16.

Referring to FIG. 16, the printing method using the inkjet printing apparatus 1000 according to one or more embodiments includes an operation S100 of ejecting ink containing dipoles onto an inspection substrate, an operation S200 of providing a target substrate and inspecting a discharge amount of the ink applied onto the inspection substrate, and an operation S300 of ejecting the ink onto the target substrate on which an electric field is formed and inspecting the number of dipoles located on the inspection substrate. The printing method using the inkjet printing apparatus 1000 may further include an operation S400 of discharging the target substrate after the operation S300 of ejecting the ink onto the target substrate on which the electric field is formed and inspecting the number of dipoles located on the inspection substrate is performed.

First, the ink containing the dipoles is ejected onto the inspection substrate (S100 in FIG. 16).

Referring to FIG. 17, the operation S100 of ejecting the ink onto the inspection substrate may include an operation S110 of providing the inspection substrate on an inspection stage unit, an operation S120 of moving the inspection stage unit to an inkjet head device, and an operation S130 of ejecting the ink containing the dipoles onto the inspection substrate.

First, the inspection substrate is provided on an inspection stage unit 200 (S110 in FIG. 17).

For example, referring to FIGS. 3 and 17, an inspection substrate ISUB may be located on an upper substrate 220 of the inspection stage unit 200, and the inspection substrate ISUB may be fixed to the upper substrate 220 using an adsorption device 210. Because the adsorption device 210 includes a vacuum device, a clamp device, or the like, the inspection substrate ISUB may be fixed to the upper substrate 220.

Thereafter, an upper surface of the inspection substrate ISUB is subjected to water repellency treatment. The water repellency treatment may be performed by fluorine coating, plasma surface treatment, or the like.

Next, the inspection stage unit is moved to the inkjet head device (S120 in FIG. 17).

For example, referring to FIGS. 1 and 18, the inspection stage unit 200, on which the inspection substrate ISUB is placed, is located on a first rail RR1 and a second rail RR2 and moved toward a lower portion of an inkjet head unit 330 of an inkjet head device 300 in a second direction D2. The inspection stage unit 200 may be moved so that the inspection substrate ISUB and the inkjet head unit 330 overlap in a third direction D3.

Next, the ink is ejected onto the inspection substrate (S130 in FIG. 17).

For example, referring to FIGS. 1, 18, and 19, the inkjet head unit 330 may eject ink I including dipoles DP onto the upper surface of the inspection substrate ISUB. The inkjet head unit 330 may be connected to a separate ink storage (not illustrated) to receive the ink I through an inner pipe IP. Nozzles NZ of an inkjet head 335 are each connected to the inner pipe IP so that the ink I may be ejected onto the upper surface of the inspection substrate ISUB through the plurality of nozzles NZ.

As described above, the ink I may include a solvent SV and a plurality of dipoles DP contained in the solvent SV. The dipoles DP contained in the ink I have random orientation when no external force acts thereon. Therefore, the orientation of the dipoles DP contained in the ink I applied onto the upper surface of the inspection substrate ISUB is not aligned in a specific direction.

Next, the target substrate is provided and a discharge amount of the ink applied onto the inspection substrate is inspected (S200 in FIG. 16).

Referring to FIG. 20, the operation S200 of providing the target substrate and inspecting the discharge amount of the ink applied onto the inspection substrate may include an operation S210 of providing the target substrate on a stage unit, and an operation S220 of inspecting the discharge amount of the ink applied onto the inspection substrate. The operation S210 of providing the target substrate on the stage unit and the operation S220 (see FIG. 20) of inspecting the discharge amount of the ink applied onto the inspection substrate may be performed substantially in real time during the printing process.

Referring to FIG. 21, a target substrate SUB may be placed on a stage 520 of the stage unit 500 (S210 in FIG. 20). Although not illustrated, the target substrate SUB may be provided from the outside by a separate substrate transfer device and located on the stage 520 of the stage unit 500.

Further, while the process of placing the target substrate SUB on the stage unit 500 is performed, a discharge amount inspection unit may inspect the discharge amount of the ink applied onto the inspection substrate (S220 in FIG. 20).

The inspection stage unit 200, on which the inspection substrate ISUB is placed, may be moved to the discharge amount inspection unit 100 to inspect the discharge amount of the ink I applied onto the inspection substrate ISUB. The inspection stage unit 200, on which the inspection substrate ISUB to which the ink I is applied is placed on an upper surface thereof, may be located on the first rail RR1 and the second rail RR2 and moved from the inkjet head unit 330 to the discharge amount inspection unit 100 in a direction that is opposite to the second direction D2. The inspection stage unit 200, on which the inspection substrate ISUB is placed, may be located below the first sensing unit 150 of the discharge amount inspection unit 100.

Referring to FIG. 20 again, the operation S210 (see FIG. 20) of providing the target substrate on the stage unit may include an operation S211 (see FIG. 20) of providing and aligning the target substrate on the stage unit, and an operation S212 (see FIG. 20) of forming an electric field on the target substrate.

For example, referring to FIGS. 22 and 23, a probe driving unit 553 of a probe unit 550 may be operated according to the process operation of the inkjet printing apparatus 1000. The probe unit 550 may further include a probe support 530 on which the probe driving unit 553 is located.

In a first state in which the target substrate SUB is not provided on the stage unit 500, the probe unit 550 may be located on the probe support 530 to be spaced apart from the stage 520. The probe driving unit 553 of the probe unit 550 may be driven in a first direction D1 that is a horizontal direction and in a third direction D3 that is a vertical direction to separate the probe pad 558 from the stage 520.

Next, in a second state in which the target substrate SUB is placed on the stage unit 500 and an electric field is formed on the target substrate SUB, the probe driving unit 553 of the probe unit 550 may be driven to connect the probe pad 558 to the target substrate SUB. The probe driving unit 553 may be driven in the third direction D3 that is the vertical direction and in the first direction D1 that is the horizontal direction so that the probe pad 558 may be brought into contact with the target substrate SUB. Probe jigs 551 and 552 of the probe unit 550 may transmit electrical signals to the probe pad 558, and the electric field may be formed on the target substrate SUB.

Meanwhile, the drawing illustrates that one probe unit 550 is located on each side of the stage unit 500 and the two probe units 550 are concurrently or substantially simultaneously connected to the target substrate SUB. However, the present disclosure is not limited thereto, and the plurality of probe units 550 may be driven separately.

Referring to FIG. 20 again, the operation S220 (see FIG. 20) of inspecting the discharge amount of the ink applied onto the inspection substrate may include an operation S221 (see FIG. 20) of inspecting the discharge amount of the ink applied onto the inspection substrate, and an operation S222 (see FIG. 20) of correcting a set value of the inkjet head device.

For example, referring to FIGS. 20, 21, and 24, the size and application position of the ink I applied onto the upper surface of the inspection substrate ISUB may be measured using the first sensing unit 150 located above the inspection substrate ISUB. Sizes $W_{I1'}$ and $W_{I2'}$ of the ink I applied onto the inspection substrate ISUB and an interval $P_{I1}$ between two spots of the ink I, which are measured using the first sensing unit 150, may be compared with reference set values.

When the measured sizes $W_{I1'}$ and $W_{I2'}$ of the ink I and interval $P_{I1}$ between the two spots of the ink I are different from the reference set values, by adjusting the position or voltage of the inkjet head 335, the set value of the inkjet head device may be corrected so that the ink I with the reference set value may be ejected. The method of adjusting the position of the inkjet head 335 is the same as that described with reference to FIG. 9. The inspection method may be repeated several times until each inkjet head 335 ejects with the size (or discharge amount) or position corresponding to the reference set value.

Next, the ink may be ejected onto the target substrate on which the electric field is formed, and the ink applied onto the inspection substrate is dried and the number of dipoles is inspected (S300 in FIG. 16).

Referring to FIG. 25, the operation S300 (see FIG. 16) of ejecting the ink onto the target substrate, on which the electric field is formed, and drying the ink applied onto the inspection substrate and inspecting the number of dipoles may include an operation S310 (see FIG. 25) of ejecting the ink onto the target substrate, and an operation S320 (see FIG. 25) of drying the ink applied onto the inspection substrate and inspecting the number of dipoles.

Referring to FIG. 26, the stage unit 500, on which the target substrate SUB is placed, may be moved to the inkjet head unit 330, and the inkjet head unit 330 may eject the ink I onto the target substrate SUB (S310 in FIG. 25).

The stage unit 500, on which the target substrate SUB is placed, is located on the first rail RR1 and the second rail RR2 and moved toward the lower portion of the inkjet head unit 330 of the inkjet head device 300 in a direction that is opposite to the second direction D2. The target substrate SUB may sequentially pass through the inkjet head unit 330 and the first heat treatment unit 370 to be moved in the direction that is opposite to the second direction D2 on the lower portion of the inkjet head device 300. Therefore, because the target substrate SUB is moved in the direction that is opposite to the second direction D2, the ink I may be ejected so that the ink I is applied onto the upper surface of the target substrate SUB on the lower portion of the inkjet head unit 330, the solvent SV of the ink I may be vaporized by the 1-1 light $H_{11}$ and 1-2 light $H_{12}$, and the dipoles DP may be aligned on the lower portion of the first heat treatment unit 370.

Further, the inspection stage unit 200, on which the inspection substrate ISUB is placed, may be moved to a particle count inspection unit 600, and the particle count inspection unit 600 may measure the number of dipoles DP contained in the ink applied onto the inspection substrate ISUB (S320 in FIG. 25).

The inspection stage unit 200, on which the inspection substrate ISUB is placed, may be located on the first rail RR1 and the second rail RR2 and moved to the particle count inspection unit 600 in the direction that is opposite to the second direction D2. The inspection stage unit 200 may be moved to the particle count inspection unit 600 so that the inspection substrate ISUB is placed between a second heat treatment unit 630 and a second sensing unit 640 of the particle count inspection unit 600.

Referring to FIG. 25 again, the operation S310 (see FIG. 25) of ejecting the ink onto the target substrate may include an operation S311 (see FIG. 25) of ejecting the ink containing the dipoles onto the target substrate on which the electric field is formed, and an operation S312 (see FIG. 25) of drying the ink applied onto the target substrate.

For example, referring to FIGS. 26 to 29, the electric field may be formed on the target substrate SUB by the probe unit 550. The dipoles DP may be oriented in one direction due to the electric field formed on the target substrate SUB.

Referring to FIG. 27, the ink I may include the dipoles DP to be ejected from the nozzles NZ of the inkjet head 335. The ink I discharged from the nozzles NZ may be ejected toward the target substrate SUB, and the ink I may be supplied onto the target substrate SUB (S311 in FIG. 25).

In this case, when an electric field IEL is formed on the target substrate SUB, the dipoles DP having a first polarity and a second polarity may receive an electrical force until the ink I is supplied from the nozzles NZ onto the target substrate SUB. The dipoles DP may be oriented due to the electrical force, and for example, the orientation of the dipoles DP may be toward the electric field IEL. The dipoles DP may receive a force caused by the electric field IEL until the dipoles DP are ejected from the nozzles NZ and reach the target substrate SUB.

Next, as illustrated in FIG. 28, an electric field E is formed on the target substrate SUB and the dipoles DP are arranged due to the electric field E. The dipoles DP may be arranged by dielectrophoresis. For example, an electrical signal is applied from the probe unit 550 to a first electrode 21 and a second electrode 22. The probe unit 550 may be connected to a pad (e.g., predetermined pad) (not illustrated) provided on the target substrate SUB and may apply the electrical signal to the first electrode 21 and the second electrode 22 that are connected to the pad. In one or more embodiments, the electrical signal may be an AC voltage, and the AC voltage may have a voltage of about ±(10 to 50) V and a frequency of about 10 kHz to about 1 MHz. When the AC voltage is applied to the first electrode 21 and the second electrode 22, the electric field E is formed between the first electrode 21 and the second electrode 22, and a dielectrophoretic force caused by the electric field E is applied to the dipoles DP. The dipoles DP may be arranged on the first electrode 21 and the second electrode 22 while the orientation and the position are changed due to the dielectrophoretic force.

Next, as illustrated in FIG. 29, the solvent SV of the ink I applied onto the target substrate SUB is dried and removed (S312 in FIG. 25).

The removal of the solvent SV may be performed by the first heat treatment unit 370 of the inkjet head device 300. As described above, the target substrate SUB, onto which the ink I ejected from the inkjet head unit 330 is applied, may be moved in the direction that is opposite to the second direction D2 to be positioned below the first heat treatment unit 370.

The first heat treatment unit 370 may irradiate the target substrate SUB with 1-1 light $H_{11}$. As described above, the 1-1 light $H_{11}$ may include infrared light. When the 1-1 light $H_{11}$ includes light in an infrared wavelength band, heat may be generated due to the infrared light in the infrared wavelength band and the solvent SV may be volatilized or vaporized.

Although not illustrated in FIG. 29, as described above, the first heat treatment unit 370 may further irradiate the target substrate SUB with 1-2 light $H_{12}$ including ultraviolet light. When the first heat treatment unit 370 irradiates light in an ultraviolet wavelength band, the dipoles DP located on the first electrode 21 and the second electrode 22 may be biased and aligned due to the light in the ultraviolet wavelength band radiated by the first heat treatment unit 370. A detailed description of the method of radiating the 1-1 light $H_{11}$ and the 1-2 light $H_{12}$ performed by the first heat treatment unit 370 is the same as that described above with reference to FIG. 12.

Because the solvent SV is removed from the ink I ejected onto the target substrate SUB, the flow of the dipoles DP may be reduced or prevented, and a bonding force with the electrodes 21 and 22 may be increased. Accordingly, the dipoles DP may be aligned on the first electrode 21 and the second electrode 22.

Referring to FIG. 25 again, the operation S320 (see FIG. 25) of drying the ink applied onto the inspection substrate and inspecting the number of dipoles may include an operation S321 (see FIG. 25) of drying the ink applied onto the inspection substrate, and an operation S322 (see FIG. 25) of measuring the number of dipoles located on the inspection substrate ISUB.

For example, referring to FIGS. 30 and 31 in the operation S320 of drying the ink applied onto the inspection substrate and inspecting the number of dipoles, the inspection may be performed using the particle count inspection unit 600.

The ink applied onto the inspection substrate ISUB may be dried using the second heat treatment unit 630 located above the inspection substrate ISUB (S321 in FIG. 25).

For example, the second heat treatment unit 630 located above the inspection substrate ISUB may irradiate the inspection substrate ISUB with second light H2. The second light H2 may include light in an infrared wavelength band. The solvent SV of the ink I applied onto the inspection substrate ISUB may be volatilized or vaporized due to the second light H2 radiated by the second heat treatment unit 630. The solvent SV of the ink I applied onto the inspection substrate ISUB is dried so that the dipoles DP contained in the ink I may be located on the inspection substrate ISUB. The dipoles DP located on the inspection substrate ISUB may be randomly located regardless of orientation.

Next, the number of dipoles DP per unit area may be measured using the second sensing unit 640 located below the inspection substrate ISUB (S322 in FIG. 25).

For example, as described above, the second sensing unit 640 may include a camera. The second sensing unit 640 including the camera may generate image data IMG as illustrated in FIG. 31 by photographing a bottom surface of the inspection substrate ISUB in a region in which the dipoles DP are located. The image data IMG generated by the second sensing unit 640 may include a pattern covered by the dipoles DP located on the upper surface of the inspection substrate ISUB.

The particle count inspection unit 600 may calculate a pattern corresponding to the dipoles DP using the image data IMG generated by the second sensing unit 640 to measure an area S2 of the pattern covered by the dipoles DP, and may compare the measured area S2 of the pattern with an area S1 of the ink I received from the first sensing unit 150. The particle count inspection unit 600 may measure the number of dipoles DP by comparing the area S1 of the ink I with the area S2 of the pattern covered by the dipoles DP on the basis of a result of the comparison.

The particle count inspection unit 600 may compare the measured number of dipoles DP with a reference set value. According to a result of comparing the number of dipoles with the reference set value, the number of dipoles DP supplied to the inkjet head device 300 may be adjusted by adjusting the ink supply device 400 that will be described below.

Next, the target substrate is discharged (S400 in FIG. 16).

Referring to FIG. 32, the target substrate SUB, on which the printing process is completed, may be located on the stage unit 500 and discharged along the first rail RR1 and the second rail RR2. The target substrate SUB may be discharged from the inkjet printing apparatus 1000 to the outside by a separate substrate transfer device. While the target substrate SUB is discharged, the inspection stage unit 200 may provide a new inspection substrate ISUB and re-perform the inspection process thereon.

In the printing method using the inkjet printing apparatus 1000 according to one or more embodiments, while the printing process is performed on the target substrate SUB, the alignment degree of the inkjet head unit 330, the discharge amount, and the number of dipoles DP include in unit ink I may be measured using the inspection substrate ISUB placed on the inspection stage unit 200, and the inspection may be performed based on the measured data. The printing process for the target substrate SUB and the inspection process for the inspection substrate ISUB may be concurrently or substantially simultaneously performed in real time using one inkjet printing apparatus 1000. The inspection result of the inspection substrate ISUB may be fed back to the inkjet head device 300 in real time, and thus the state of the inkjet head device 300 may be adjusted and compensated. Therefore, the inkjet printing apparatus 1000 can reduce a printing process time by maintaining the quality of the target substrate SUB including the finally manufactured dipoles DP and shortening the inspection time, even after the process is repeated several times.

FIG. 33 is a schematic view of a light-emitting element according to one or more embodiments.

Referring to FIG. 33, a light-emitting element 30 may include a semiconductor crystal doped with arbitrary conductivity type (e.g., p-type or n-type) impurities. The semiconductor crystal may receive an electrical signal applied from an external power source and may emit the electrical signal as light in a corresponding wavelength band.

The light-emitting element 30 may be a light-emitting diode, and may be an inorganic light-emitting diode that has a size in units of micrometers or nanometers and is made of an inorganic material. In the case in which the light-emitting element 30 is an inorganic light-emitting diode, when an electric field is formed between two electrodes facing each other in a corresponding direction, the inorganic light-emitting diode may be aligned between the two electrodes in which a polarity is formed. The light-emitting element 30 may emit light in a corresponding wavelength band by receiving an electrical signal (e.g., predetermined electrical signal) from the electrodes.

Referring to FIG. 33, the light-emitting element 30 according to one or more embodiments may include a plurality of conductive semiconductors 31 and 32, an active layer 33, an electrode material layer 37, and an insulating film 38. The plurality of conductive semiconductors 31 and 32 may transmit an electrical signal transmitted to the light-emitting element 30 to the active layer 33, and the active layer 33 may emit light in a corresponding wavelength band.

For example, the light-emitting element 30 may include a first conductive semiconductor 31, a second conductive semiconductor 32, the active layer 33 located between the first conductive semiconductor 31 and the second conductive semiconductor 32, the electrode material layer 37 located on the second conductive semiconductor 32, and the insulating film 38 located to surround outer surfaces thereof. In FIG. 30, the light-emitting element 30 is illustrated as having a structure in which the first conductive semiconductor 31, the active layer 33, the second conductive semiconductor 32, and the electrode material layer 37 are sequentially formed in a longitudinal direction, but the present disclosure is not limited thereto. The electrode material layer 37 may be omitted, and in some embodiments, the electrode material layer 37 may be located on at least one of both side surfaces of the first conductive semiconductor 31 and the second conductive semiconductor 32. The following description of the light-emitting element 30 may equally apply when the light-emitting element 30 further includes another structure.

The first conductive semiconductor 31 may be an n-type semiconductor layer. For example, when the light-emitting element 30 emits light in a blue wavelength band, the first conductive semiconductor 31 may be a semiconductor material having a chemical formula of $In_xAl_yGa_{1-x-y}N$ ($0 \leq x \leq 1$, $0 \leq y \leq 1$, $0 \leq x+y \leq 1$). For example, the first conductive semiconductor 31 may be at least one of InAlGaN, GaN, AlGaN, InGaN, AlN, and InN doped with an n-type impurity. The first conductive semiconductor 31 may be doped with a first conductive dopant, and the first conductive dopant may be, for example, Si, Ge, Sn, or the like. A length of the first conductive semiconductor 31 may range from about 1.5 μm to about 5 μm, but the present disclosure is not limited thereto.

The second conductive semiconductor 32 may be a p-type semiconductor layer. For example, when the light-emitting element 30 emits light in a blue wavelength band, the second conductive semiconductor 32 may be a semiconductor material having a chemical formula of $In_xAl_yGa_{1-x-y}N$ ($0 \leq x \leq 1$, $0 \leq y \leq 1$, $0 \leq x+y \leq 1$). For example, the second conductive semiconductor 32 may be at least one of InAlGaN, GaN, AlGaN, InGaN, AlN, and InN doped with a p-type impurity. The second conductive semiconductor 32 may be doped with a second conductive dopant, and the second conductive dopant may be, for example, Mg, Zn, Ca, Se, Ba, or the like. A length of the second conductive semiconductor 32 may range from about 0.08 μm to about 0.25 μm, but the present disclosure is not limited thereto.

Meanwhile, although it is illustrated that the first conductive semiconductor 31 and the second conductive semiconductor 32 are configured as one layer in the drawing, the present disclosure is not limited thereto. In some cases, the first conductive semiconductor 31 and the second conductive semiconductor 32 may include a larger number of layers according to a material of the active layer 33 that will be described below.

The active layer 33 may be located between the first conductive semiconductor 31 and the second conductive semiconductor 32 and may include a material having a single- or multi-quantum well structure. When the active layer 33 includes a material having a multi-quantum well structure, the active layer 33 may have a structure in which a plurality of quantum layers and a plurality of well layers are alternately stacked. The active layer 33 may emit light by coupling pairs of electrons and holes according to the electrical signal applied through the first conductive semiconductor 31 and the second conductive semiconductor 32. For example, when the active layer 33 emits light in a blue wavelength band, the active layer 33 may include a material such as AlGaN, AlInGaN, or the like. For example, when the active layer 33 has a multi-quantum well structure, that is, a structure in which quantum layers and well layers are alternately stacked, the quantum layers may include a material such as AlGaN or AlInGaN, and the well layers may include a material such as GaN, AlGaN, or the like.

However, the present disclosure is not limited thereto, and the active layer 33 may have a structure in which semiconductor materials having high band gap energy and semiconductor materials having low band gap energy are alternately stacked, and may include different group 3 to group 5 semiconductor materials according to the wavelength band of the emitted light. The light emitted from the active layer 33 is not limited to light in the blue wavelength band, and in some cases, light in a red or green wavelength band may be emitted. A length of the active layer 33 may range from about 0.05 μm to about 0.25 μm, but the present disclosure is not limited thereto.

Meanwhile, the light emitted from the active layer 33 may be emitted to a side surface of the light-emitting element 30 and side surfaces (or a bottom surface) positioned on respective ends of the light-emitting element 30 in a longitudinal direction. The direction of the light emitted from the active layer 33 is not limited to one direction.

The electrode material layer 37 may be an ohmic contact electrode. However, the present disclosure is not limited thereto, and the electrode material layer 37 may be a Schottky contact electrode. The electrode material layer 37 may include a conductive metal. For example, the electrode material layer 37 may include at least one of aluminum (Al), titanium (Ti), indium (In), gold (Au), silver (Ag), indium tin oxide (ITO), indium zinc oxide (IZO), and indium tin-zinc oxide (ITZO). The electrode material layer 37 may include the same material or different materials, but the present disclosure is not limited thereto.

The insulating film 38 may be brought into contact with the first conductive semiconductor 31, the second conductive semiconductor 32, the active layer 33, and the electrode material layer 37 and formed to surround the outer surfaces thereof. The insulating film 38 may function to protect the members. For example, the insulating film 38 may be formed to surround side surfaces of the members, and both end portions of the light-emitting element 30 in the longitudinal direction may be formed to be exposed. However, the present disclosure is not limited thereto.

The insulating film 38 may include materials having insulating properties, for example, silicon oxide ($SiO_x$), silicon nitride ($SiN_x$), silicon oxynitride ($SiO_xN_y$), aluminum nitride (AlN), aluminum oxide ($Al_2O_3$), and the like. Accordingly, the active layer 33 may reduce or prevent the likelihood of electrical disconnection that may occur when the light-emitting element 30 is brought into direct contact with the electrodes through which an electrical signal is transmitted. Further, because the insulating film 38 in addition to the active layer 33 protects the outer surface of the light-emitting element 30, a decrease in light emission efficiency can be reduced or prevented.

Although it is illustrated that the insulating film 38 is formed to extend in the longitudinal direction of the light-emitting element 30 to cover from the first conductive semiconductor 31 to the electrode material layer 37 in the drawing, the present disclosure is not limited thereto. The insulating film 38 may cover only the first conductive semiconductor 31, the active layer 33, and the second conductive semiconductor 32, or cover a portion of the outer surface of the electrode material layer 37 so that the portion of the outer surface of the electrode material layer 37 may be exposed. A thickness of the insulating film 38 may range from about 0.5 μm to about 1.5 μm, but the present disclosure is not limited thereto.

FIG. 34 is a plan view of a display device manufactured by a method according to one or more embodiments. FIG. 35 is a partial cross-sectional view of the display device taken along the line I-I' of FIG. 34.

Referring to FIG. 34, a display device 1 may include a plurality of pixels PX. Each of the pixels PX may include one or more light-emitting elements 30 that emit light in a corresponding wavelength band to display a corresponding color.

Each of the plurality of pixels PX may include a first subpixel SPX1, a second subpixel SPX2, and a third subpixel SPX3. The first subpixel SPX1 may emit light of a first color, the second subpixel SPX2 may emit light of a second color, and the third subpixel SPX3 may emit light of a third color. The first color may be red, the second color may be green, and the third color may be blue, but the present disclosure is not limited thereto, and each of the subpixels SPXn may emit light of the same color. Further, although it is illustrated that each of the pixels PX includes three subpixels in FIG. 34, the present disclosure is not limited thereto, and each of the pixels PX may include a larger number of subpixels.

Each of the subpixels SPXn of the display device 1 may include regions defined as a light-emitting region and a non-light-emitting region. The light-emitting region is defined as a region in which the light-emitting element 30 included in the display device 1 is located and light in a corresponding wavelength band is emitted. The non-light-emitting region is a region other than the light-emitting region and may be defined as a region in which the light-emitting element 30 is not located and light is not emitted.

The subpixels SPXn of the display device 1 may include a plurality of partitions 41, 42, and 43, a plurality of electrodes 21 and 22, and light-emitting elements 30.

The plurality of electrodes 21 and 22 may be electrically connected to the light-emitting elements 30 and may receive a voltage (e.g., predetermined voltage) so that the light-emitting elements 30 emit light. Further, at least a portion of each of the electrodes 21 and 22 may be used to form an electric field in the subpixel SPXn to align the light-emitting elements 30. However, the present disclosure is not limited thereto, and in some cases, the electric field may be formed by a separate alignment signal applying device.

The plurality of electrodes 21 and 22 may include a first electrode 21 and a second electrode 22. The first electrode 21 and the second electrode 22 may be located apart from each other. In one or more embodiments, the first electrode 21 may be a pixel electrode separated for each subpixel SPXn, and the second electrode 22 may be a common electrode connected in common along each subpixel SPXn. One of the first electrode 21 and the second electrode 22 may be an anode electrode of the light-emitting element 30 and the other may be a cathode electrode of the light-emitting element 30. However, the present disclosure is not limited thereto and the opposite is also possible.

The first electrode 21 and the second electrode 22 may respectively include electrode stem portions 21S and 22S that are located to extend in a first direction D1, and at least one of electrode branch portions 21B and 22B that extend and are branched off from the electrode stem portions 21S and 22S in a second direction D2 that is a direction crossing the first direction D1.

For example, the first electrode 21 may include a first electrode stem portion 21S that extends in the first direction D1, and at least one first electrode branch portion 21B that is branched off from the first electrode stem portion 21S to extend in the second direction (Y-axis direction) D2.

Both ends of the first electrode stem portion 21S of any one pixel are separated from each other between the respective subpixels SPXn and terminated, and may be placed on substantially the same straight line as the first electrode stem portion 21S of a neighboring subpixel belonging to the same row (e.g., adjacent in the first direction D1). Accordingly, the first electrode stem portion 21S located on each subpixel SPXn may apply different electrical signals to each first electrode branch portion 21B, and the first electrode branch portions 21B may be driven separately.

The second electrode 22 may include a second electrode stem portion 22S that extends in the first direction D1 and is located apart from the first electrode stem portion 21S to face the first electrode stem portion 21S, and a second electrode branch portion 22B that is branched off from the second electrode stem portion 22S and located to extend in the second direction D2. However, another end portion of the second electrode stem portion 22S may extend to a plurality of subpixels SPXn adjacent thereto in the first direction D1. Accordingly, both ends of the second electrode stem portion 22S of any one pixel may be connected to the second electrode stem portion 22S of the neighboring pixel between the respective pixels PX.

A plurality of partitions may include third partitions 43 located at boundaries between the respective subpixels SPXn, and a first partition 41 and a second partition 42 that are respectively located below the electrodes 21 and 22.

The third partitions 43 may be located at the boundaries between the respective subpixels SPXn. The plurality of subpixels SPXn may be divided based on the third partitions 43.

A plurality of light-emitting elements 30 may be arranged between the first electrode branch portion 21B and the second electrode branch portion 22B. At least some of the plurality of light-emitting elements 30 may have one end portion electrically connected to the first electrode branch portion 21B and the other end portion electrically connected to the second electrode branch portion 22B.

The plurality of light-emitting elements 30 may be spaced apart from each other in the second direction D2 and arranged substantially parallel to each other. An interval at which the light-emitting elements 30 are spaced apart from each other is not particularly limited.

A contact electrode 26 may be located on each of the first electrode branch portion 21S and the second electrode branch portion 22B. The contact electrode 26 may be substantially located on a first insulating layer 51, and at least a portion of the contact electrode 26 may be brought into contact with or electrically connected to the first electrode branch portion 21B and the second electrode branch portion 22B.

Referring to FIGS. 34 and 35, the display device 1 may further include a via layer 20, and the plurality of electrodes 21 and 22, the partitions 41, 42, and 43, and the light-emitting elements 30 described above may be located on the via layer 20. A circuit element layer (not illustrated) may be further located below the via layer 20. The via layer 20 may include an organic insulating material to perform a surface planarization function.

The plurality of partitions 41, 42, and 43 may be located apart from each other in each subpixel SPXn. The plurality of partitions 41, 42, and 43 may include the first partition 41 and the second partition 42, which are located adjacent to a central portion of the subpixel PXn, and the third partitions 43 located at the boundaries between the subpixels PXn.

The first partition 41 and the second partition 42 are spaced apart from each other and located to face each other. The first electrode 21 may be located on the first partition 41, and the second electrode 22 may be located on the second partition 42. In FIGS. 34 and 25, it may be understood that the first electrode branch portion 21B is located on the first partition 41 and the second partition 42 is located on the second partition 42.

The plurality of partitions 41, 42, and 43 may include polyimide (PI).

The plurality of partitions 41, 42, and 43 may have a structure in which at least a portion protrudes from the via layer 20. The partitions 41, 42, and 43 may protrude upward from a flat surface on which the light-emitting elements 30 are located, and at least a portion of the protruding portion may have an inclination. As illustrated in the drawing, the first partition 41 and the second partition 42 may protrude at the same height, and the third partition 43 may have a shape that protrudes to a higher position.

The first electrode 21 and the second electrode 22 may be located on the first partition 41 and the second partition 42, respectively. The first electrode 21 and the second electrode 22 may transmit an electrical signal to the light-emitting elements 30, and at the same time, may reflect light emitted from the light-emitting elements 30. In one or more embodiments, the first electrode 21 and the second electrode 22 may include a conductive material having high reflectance. For example, the first electrode 21 and the second electrode 22 may be an alloy including aluminum (Al), nickel (Ni), lanthanum (La), or the like. However, the present disclosure is not limited thereto.

The first insulating layer 51 is located to partially cover the first electrode 21 and the second electrode 22. A portion of each of the first electrode 21 and the second electrode 22 may be exposed through the first insulating layer 51. The first insulating layer 51 may be located to partially cover a region in which the first electrode 21 and the second electrode 22 are spaced apart from each other, and a region opposite to the region in which the first electrode 21 and the second electrode 22 are spaced apart from each other.

The first insulating layer 51 may protect the first electrode 21 and the second electrode 22, and at the same time, may insulate the first electrode 21 and the second electrode 22 from each other. Further, the light-emitting elements 30 located on the first insulating layer 51 may be prevented from being brought into direct contact with the other members and damaged.

The light-emitting elements 30 may be located on the first insulating layer 51. At least one light-emitting element 30 may be located on the first insulating layer 51 between the first electrode 21 and the second electrode 22.

A second insulating layer 52 may be partially located on the light-emitting element 30. The second insulating layer 52 may protect the light-emitting element 30, and at the same time, may perform a function of fixing the light-emitting element 30 in the manufacturing process of the display device 1. The second insulating layer 52 may be located to surround an outer surface of the light-emitting element 30. That is, a portion of a material of the second insulating layer 52 may be located between a lower surface of the light-emitting element 30 and the first insulating layer 51.

The contact electrode 26 is located on each of the electrodes 21 and 22 and the second insulating layer 52. The contact electrode 26 includes a first contact electrode 26a located on the first electrode 21 and a second contact electrode 26b located on the second electrode 22. The first contact electrode 26a and the second contact electrode 26b are located apart from each other on the second insulating layer 52. Accordingly, the second insulating layer 52 may insulate the first contact electrode 26a and the second contact electrode 26b from each other.

The first contact electrode 26a may at least be brought into contact with the first electrode 21, which is exposed by patterning the first insulating layer 51, and one end portion of the light-emitting element 30. The second contact electrode 26b may at least be brought into contact with the second electrode 22, which is exposed by patterning the first insulating layer 51, and the other end portion of the light-emitting element 30.

The contact electrode 26 may include a conductive material. For example, the contact electrode 26 may include ITO, IZO, ITZO, aluminum (Al), or the like. However, the present disclosure is not limited thereto.

A passivation layer 55 may be formed on upper portions of the second insulating layer 52 and the contact electrode 26 to protect the members located on the via layer 20 from an external environment.

Each of the first insulating layer 51, the second insulating layer 52, and the passivation layer 55 described above may include an inorganic insulating material or an organic insulating material. In one or more embodiments, the first insulating layer 51 and the passivation layer 55 may include a material such as silicon oxide ($SiO_x$), silicon nitride ($SiN_x$), silicon oxynitride ($SiO_xN_y$), aluminum oxide ($Al_2O_3$), aluminum nitride (AlN), or the like.

While embodiments of the present disclosure have been described above with reference to the accompanying drawings, it will be understood by those skilled in the art that various modifications can be made without departing from the scope of the present disclosure and without changing essential features. Therefore, the above-described embodiments should be considered in a descriptive sense only and not for purposes of limitation.

The invention claimed is:

1. An inkjet printing apparatus comprising:
an inspection stage unit configured to support an inspection substrate;
an inkjet head unit including at least one inkjet head configured to eject ink, which contains a solvent, and dipoles dispersed in the solvent, on the inspection stage unit;
a particle count inspection unit that is located apart from the inkjet head unit in one direction,
and that includes a first heat treatment unit located above the inspection stage unit; and
a first sensing unit located below the inspection stage unit and configured to measure a number of dipoles ejected onto the inspection substrate.

2. The inkjet printing apparatus of claim 1, further comprising a second sensing unit configured to measure a position of first ink that is ejected from the inkjet head and applied onto the inspection substrate.

3. The inkjet printing apparatus of claim 2, wherein the first sensing unit is configured to the number of dipoles located in a region corresponding to the position of the first ink.

4. The inkjet printing apparatus of claim 3, wherein the first sensing unit is configured to measure the number of dipoles that remain on the inspection substrate after the solvent is removed by the first heat treatment unit.

5. The inkjet printing apparatus of claim 2, wherein:
the particle count inspection unit further includes a light irradiation unit that is located above the inspection stage unit and emits light toward the inspection stage unit; and
the first sensing unit includes a camera unit for photographing a lower surface of the inspection substrate.

6. The inkjet printing apparatus of claim 5, wherein the camera unit is configured to generate image data by photographing a region corresponding to the position of the first ink.

7. The inkjet printing apparatus of claim 6, wherein the second sensing unit is configured to measure an area of the first ink, and the first sensing unit is configured to calculate a dipole pattern using the image data and is configured to measure an area of the dipole pattern.

8. The inkjet printing apparatus of claim 7, wherein the particle count inspection unit is configured to measure the number of dipoles by comparing the area of the first ink with the area of the dipole pattern.

9. The inkjet printing apparatus of claim 8, wherein the particle count inspection unit is configured to compare the number of dipoles with a reference set value.

10. The inkjet printing apparatus of claim 9, further comprising an ink supply device for supplying the ink to the inkjet head unit,
wherein the particle count inspection unit is configured to control the ink supply device according to a result of a comparison of the number of dipoles and the reference set value.

11. The inkjet printing apparatus of claim 1, further comprising a stage moving unit configured to move the inspection stage unit in one direction.

12. The inkjet printing apparatus of claim 1, wherein the first heat treatment unit radiates light in an infrared wavelength band.

13. An inkjet printing apparatus comprising:
an inspection stage unit on which an inspection substrate is placed;
a stage unit that is located apart from the inspection stage unit and on which a target substrate is placed;
an inkjet head unit that is located above the inspection stage unit and the stage unit and that includes a plurality of inkjet heads configured to eject ink, which contains dipoles and a solvent in which the dipoles are dispersed;
a first heat treatment unit located above the stage unit and configured to radiate first light;
a first sensing unit configured to measure a position of the ink applied onto the inspection substrate; and
a particle count inspection unit configured to inspect a number of dipoles contained in the ink applied onto the inspection substrate,
wherein the particle count inspection unit includes a second heat treatment unit located above the inspection stage unit and configured to radiate second light, and
a second sensing unit located above the inspection stage unit and configured to measure the number of dipoles contained in the ink applied onto the inspection substrate.

14. The inkjet printing apparatus of claim 13, wherein the second sensing unit is configured to measure the number of dipoles that remain on the inspection substrate after the solvent is removed by the second heat treatment unit.

15. The inkjet printing apparatus of claim 14 further comprising an ink supply device configured to supply the ink to the inkjet head unit,
wherein the particle count inspection unit configured to control the ink supply device according to a result of comparing the number of dipoles with a reference set value.

16. A method of inspecting an inkjet head, comprising:
ejecting ink, which contains a plurality of dipoles and a solvent in which the plurality of dipoles are dispersed, on an inspection substrate;
inspecting a discharge amount of the ink applied onto the inspection substrate;
removing the solvent contained in the ink applied onto the inspection substrate; and
measuring a number of dipoles remaining on the inspection substrate.

17. The method of claim 16, wherein the inspecting of the discharge amount of the ink includes measuring a diameter and area of the ink applied onto the inspection substrate.

18. The method of claim 17, wherein the measuring of the number of dipoles includes calculating a dipole pattern by photographing the inspection substrate from under the inspection substrate and measuring an area of the dipole pattern.

19. The method of claim 18, wherein the measuring of the number of dipoles comprises comparing the area of the ink with the area of the dipole pattern.

20. The method of claim 16, wherein the dipoles remaining on the inspection substrate are arranged regardless of orientation.

* * * * *